(12) United States Patent  (10) Patent No.: US 8,100,430 B2
Meyers et al.  (45) Date of Patent: Jan. 24, 2012

(54) CONVERTIBLE HAND TRUCK

(75) Inventors: Paul F. Meyers, Fishers, IN (US);
Thomas J. Meyers, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 961 days.

(21) Appl. No.: 12/034,600

(22) Filed: Feb. 20, 2008

(65) Prior Publication Data
US 2008/0203687 A1  Aug. 28, 2008

Related U.S. Application Data

(60) Provisional application No. 60/891,389, filed on Feb. 23, 2007.

(51) Int. Cl.
B62B 3/02 (2006.01)
(52) U.S. Cl. .......................... 280/651; 280/30
(58) Field of Classification Search ............. 280/30, 280/47.18, 47.2, 47.24, 47.27, 638, 639, 280/651, 654, 655
See application file for complete search history.

(56) References Cited

U.S. PATENT DOCUMENTS

| | | | |
|---|---|---|---|
| 2,363,619 A | 11/1944 | Prieto | |
| 2,598,168 A * | 5/1952 | Hooz et al. | 280/641 |
| 2,786,692 A | 3/1957 | Timpson | |
| 3,785,669 A | 1/1974 | Doheny | |
| 4,227,709 A | 10/1980 | Gradwohl et al. | |
| 4,358,124 A | 11/1982 | Geschwender | |
| 4,659,096 A | 4/1987 | Leimgruber | |
| 4,681,330 A * | 7/1987 | Misawa | 280/47.2 |
| 4,921,270 A | 5/1990 | Schoberg | |
| 5,476,282 A | 12/1995 | Dahl | |
| 5,536,034 A | 7/1996 | Miller | |
| 5,709,400 A * | 1/1998 | Bonnier et al. | 280/650 |
| 5,779,251 A * | 7/1998 | Meier | 280/47.2 |
| 5,810,373 A * | 9/1998 | Miranda | 280/47.2 |
| 6,053,515 A | 4/2000 | Kelley | |
| 6,273,438 B1 | 8/2001 | Prapavat | |
| 6,308,967 B1 * | 10/2001 | Stallbaumer et al. | 280/47.18 |
| 6,328,319 B1 | 12/2001 | Stahler, Sr. | |
| 6,364,328 B1 | 4/2002 | Stahler, Sr. | |
| 6,419,244 B2 | 7/2002 | Meabon | |
| 6,880,835 B2 | 4/2005 | Tornabene et al. | |
| 6,945,545 B2 | 9/2005 | Celli | |
| 7,168,712 B2 | 1/2007 | Celli | |
| 2004/0256818 A1 | 12/2004 | Amsili | |

FOREIGN PATENT DOCUMENTS

DE  6751061  1/1969

* cited by examiner

*Primary Examiner* — Frank Vanaman
(74) *Attorney, Agent, or Firm* — Barnes & Thornburg LLP

(57) ABSTRACT

A multi-mode hand truck is convertible to assume a hand-truck mode, a reclined load-assist mode, and a push-cart mode.

33 Claims, 10 Drawing Sheets

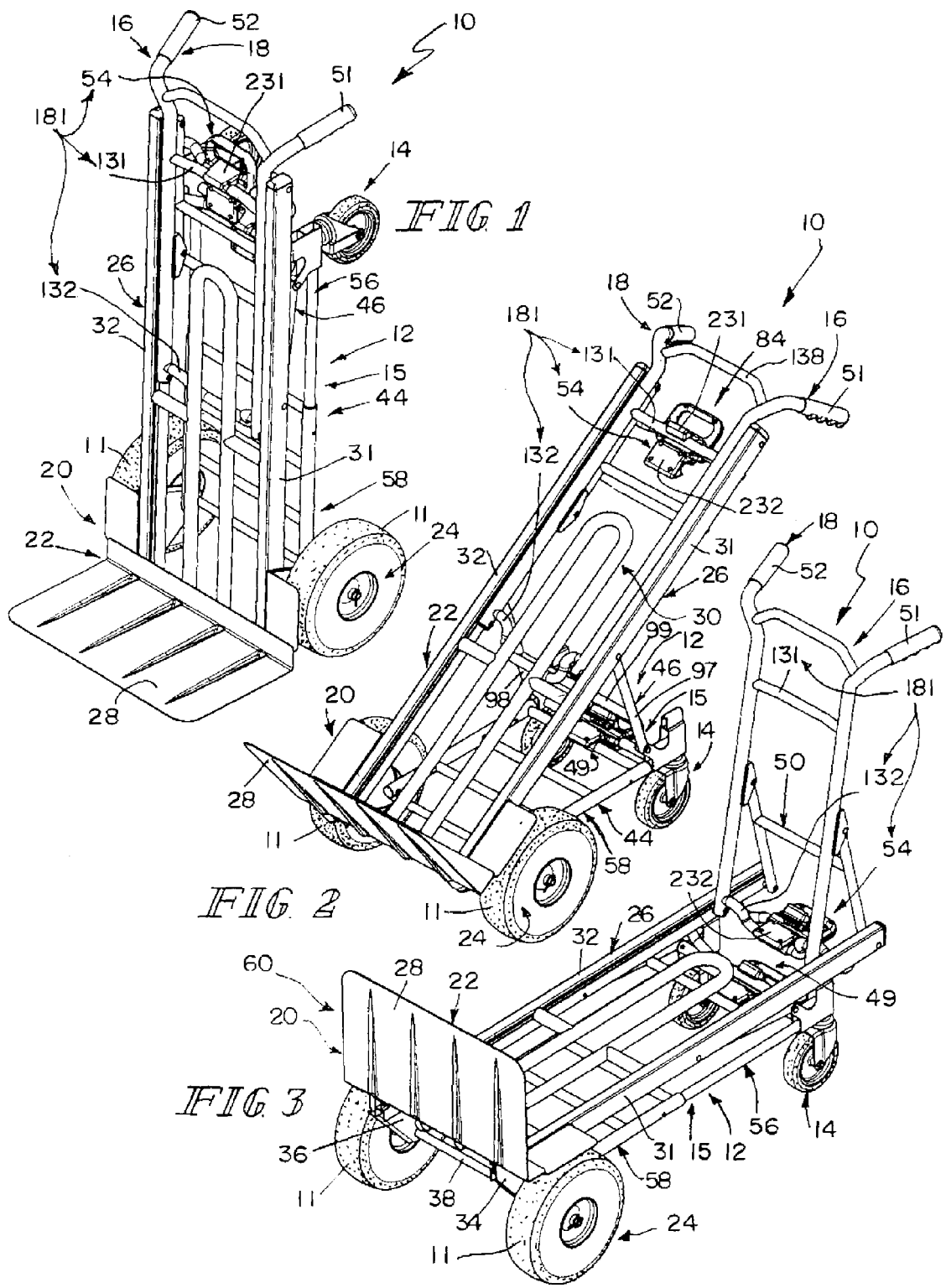

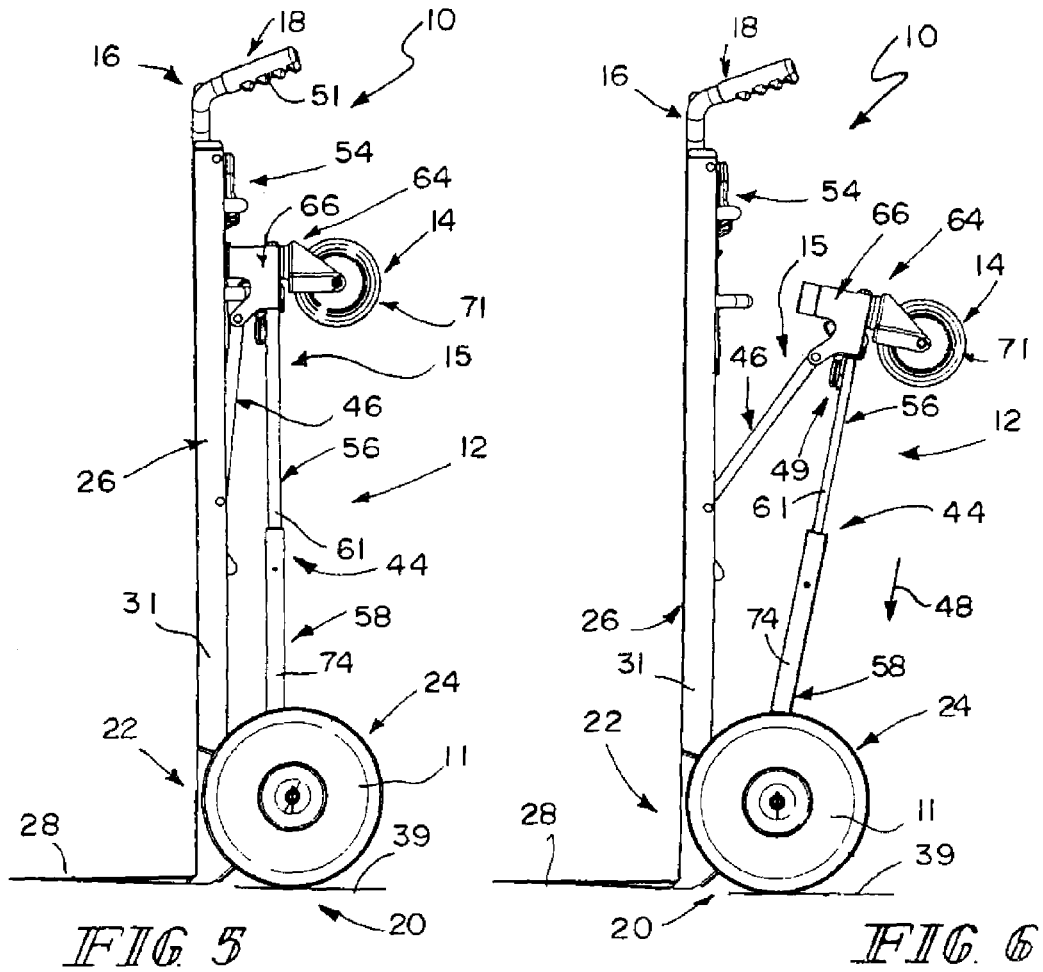
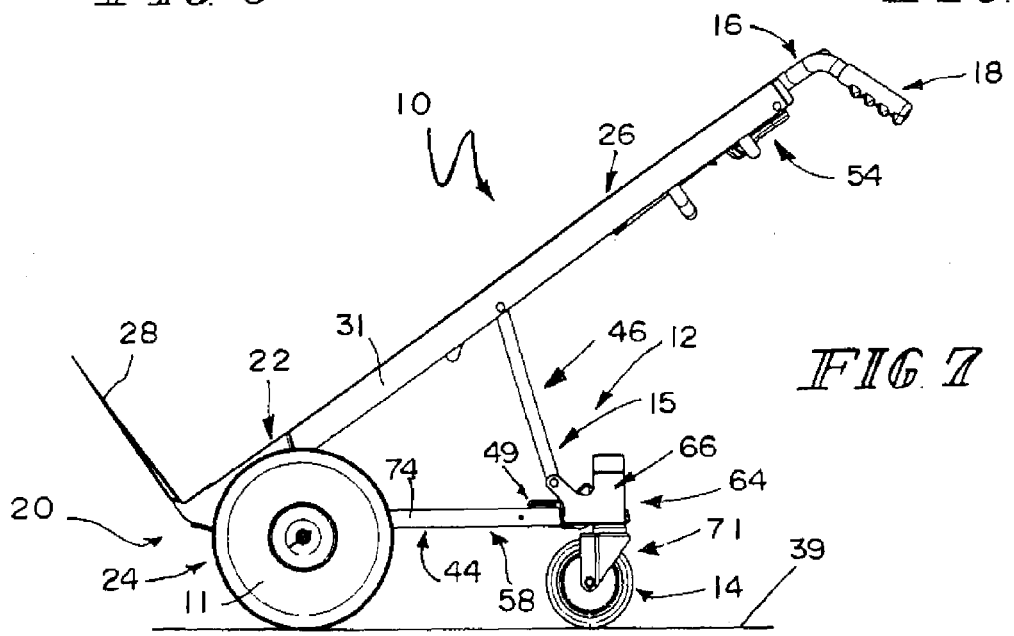

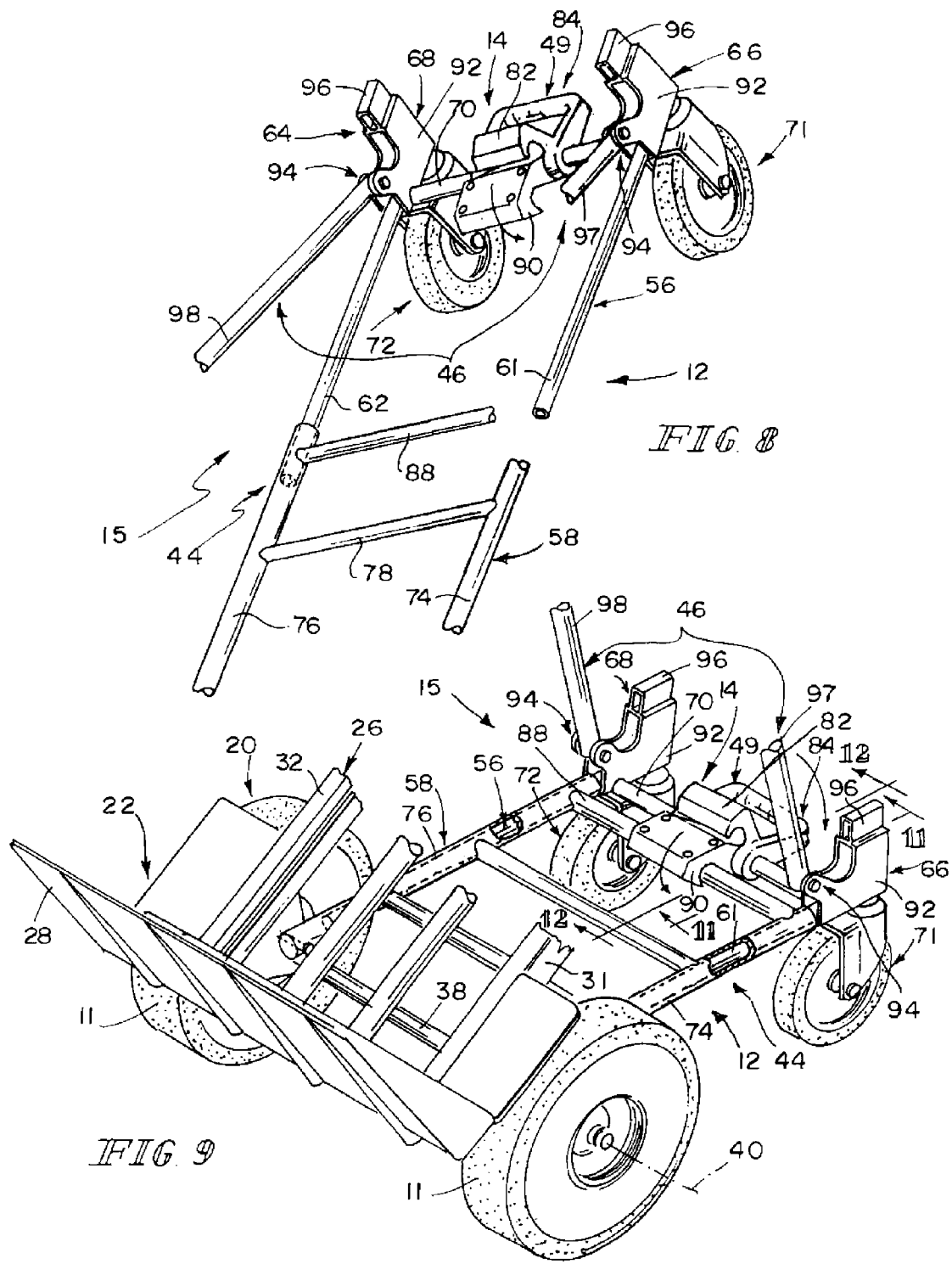

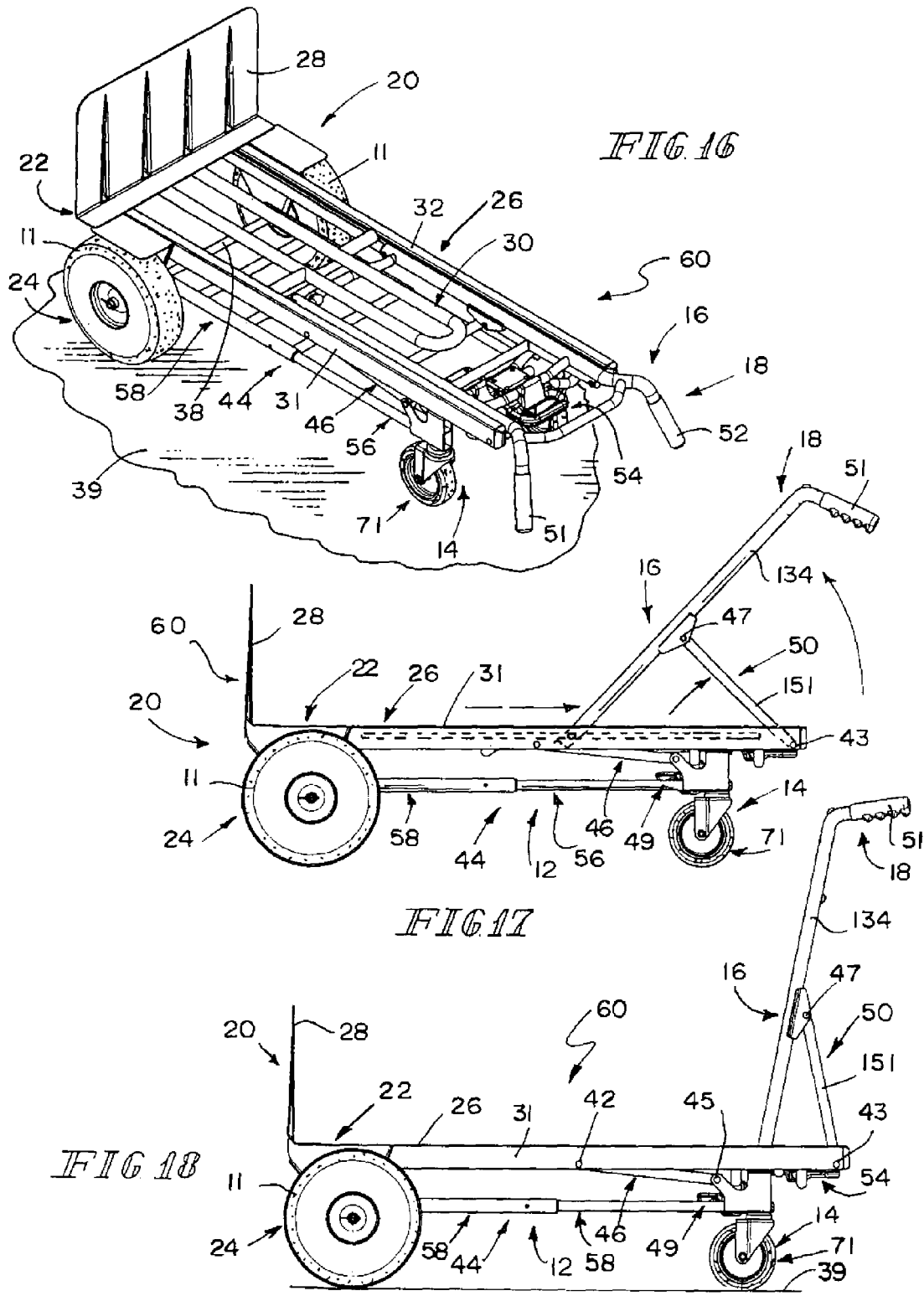

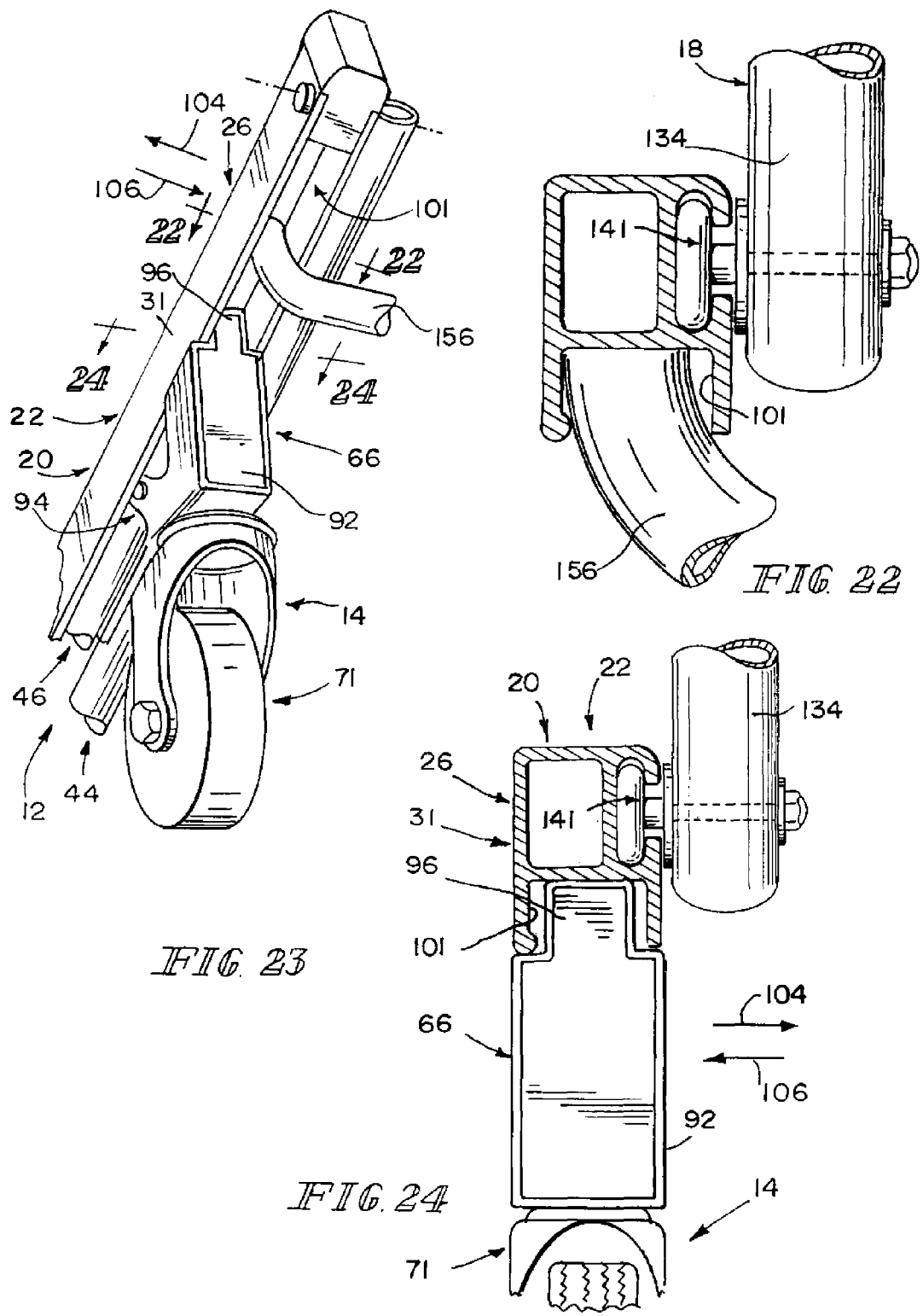

CONVERTIBLE HAND TRUCK

This application claims priority under 35 §U.S.C. 119(e) to U.S. Provisional Application No. 60/891,389, filed on Feb. 23, 2007, which is expressly incorporated by reference herein.

BACKGROUND

The present disclosure relates to a hand truck and particularly to a convertible hand truck. More particularly, the present disclosure is related to a hand truck that can be reconfigured in the field by a user to function in any of several operating modes.

SUMMARY

According to the present disclosure, a hand truck includes a rolling base including a load carrier and a carrier wheel unit coupled to the load carrier. The hand truck is convertible to assume either a two-wheel hand truck mode, an outrigger-wheel hand truck mode, and a push-cart mode to carry a variety of cargo loads.

In illustrative embodiments, the multi-mode hand truck includes a rolling load-carrier stabilizer that is coupled to the load carrier and configured to unfold to support the load carrier in a reclined position. The rolling load-carrier stabilizer includes a foldable stabilizer frame coupled to the load carrier and an outrigger wheel unit coupled to the foldable stabilizer frame. The foldable stabilizer frame comprises an extensible wheel-support frame and a pivotable carrier-recline support link.

The stabilizer also includes a frame lock unit that is coupled to the foldable stabilizer frame to move therewith relative to the load carrier. The frame lock unit is operable by a user in the field to retain the outrigger wheel unit in (1) a retracted storage position alongside the load carrier when the foldable stabilizer frame is folded so as to establish the two-wheel hand truck mode and, alternatively, in (2) an extended carrier-stabilizer position away from the load carrier when the foldable stabilizer frame is unfolded so as to establish the outrigger-wheel hand truck mode.

In illustrative embodiments, the multi-mode hand truck includes a push handle and a pivotable push-handle support link. The push handle is coupled to the load carrier for slidable movement relative to the load carrier between a retracted position arranged to lie alongside the load carrier and an extended position arranged to extend upwardly away from the load carrier. The pivotable push-handle support link is coupled to both of the load carrier and the push handle and is configured to support the push handle in the extended position to establish the push-cart mode. A handle lock unit is provided to lock the push handle in either the retracted position or the extended position.

Additional features of the present disclosure will become apparent to those skilled in the art upon consideration of the following detailed description of illustrative embodiments exemplifying the best mode of carrying out the disclosure as presently perceived.

BRIEF DESCRIPTION OF TUE DRAWINGS

The detailed description particularly relates to the accompanying figures in which:

FIG. 1 is a perspective view of a multi-mode convertible hand truck in accordance with the present disclosure configured by a user in the field to assume a two-wheel hand truck mode;

FIG. 2 is a perspective view similar to FIG. 1 after the multi-mode hand truck of FIG. 1 has been reconfigured by a user in the field (in a manner shown, for example, in FIGS. 5-7) to assume an outrigger-wheel hand truck mode;

FIG. 3 is a perspective view similar to FIGS. 1 and 2 after the multi-mode hand truck of FIG. 1 has been reconfigured by a user in the field (in a manner shown, for example, in FIGS. 16-18 and 19-21) to assume a push-cart mode;

Figure 4:
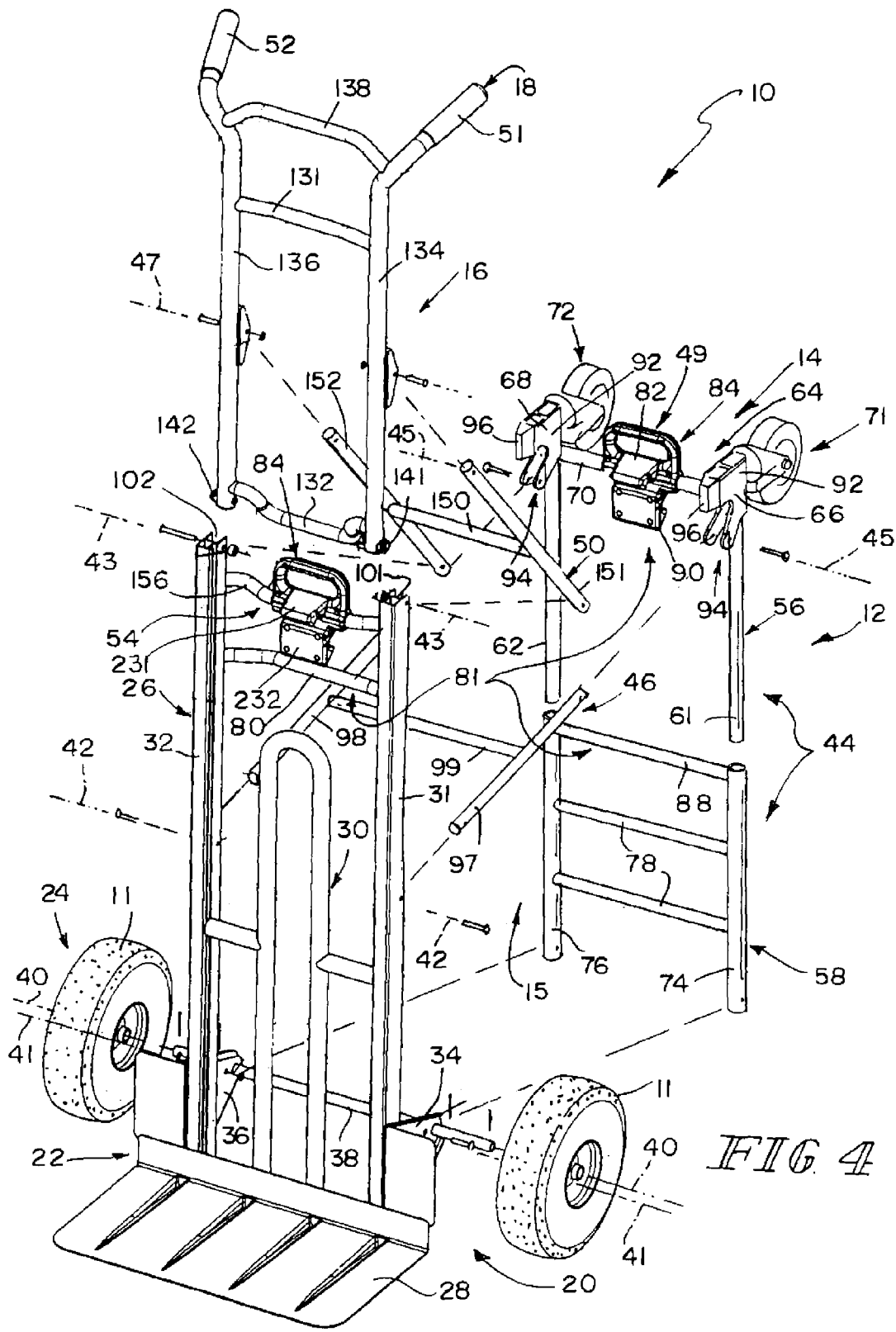
Figure 10:
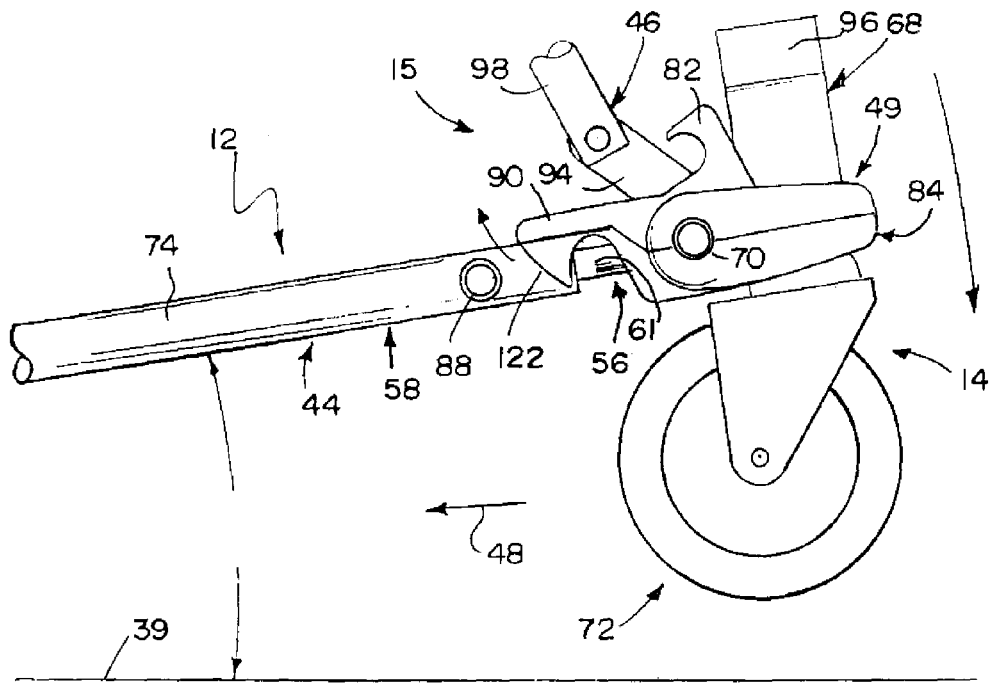
Figure 11:
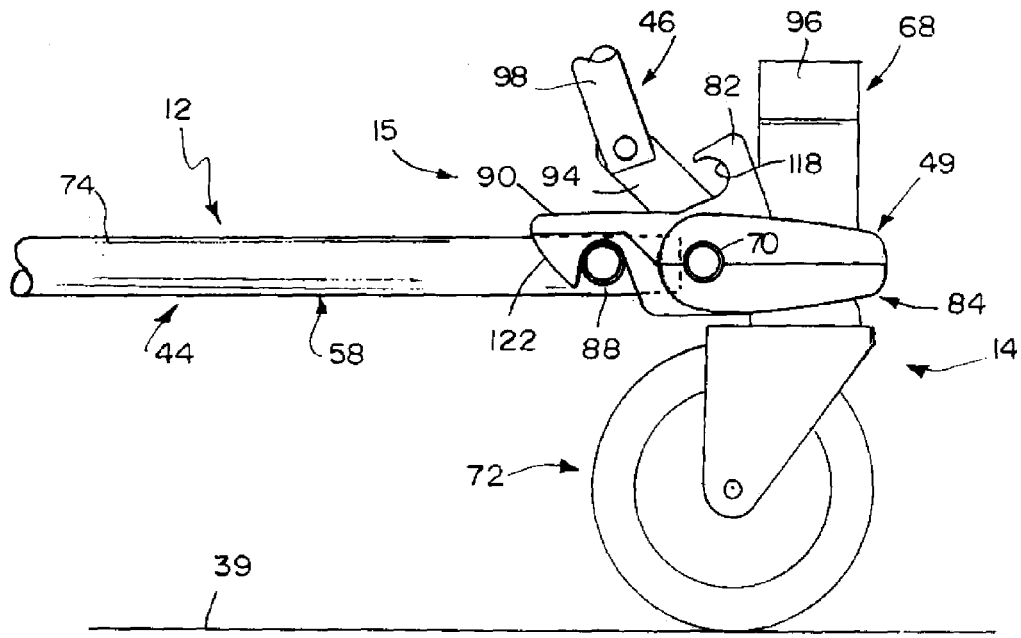
Figure 12:
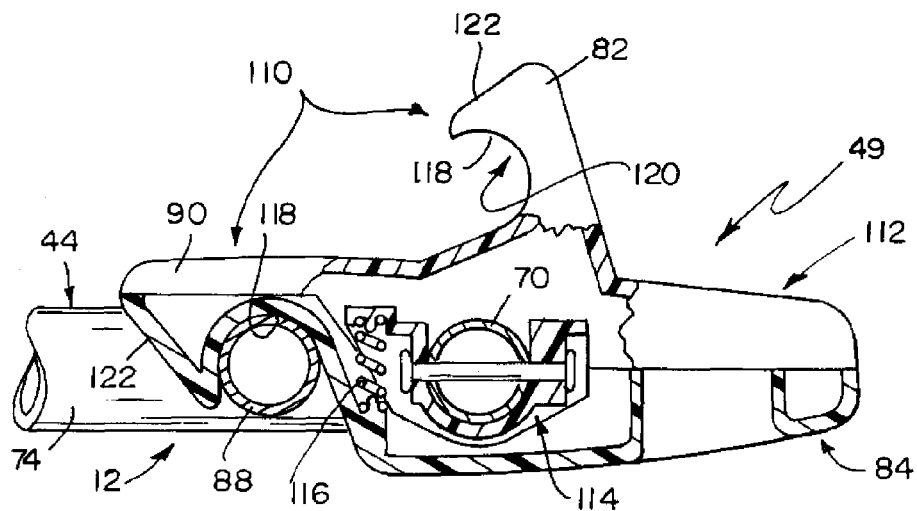
Figure 13:
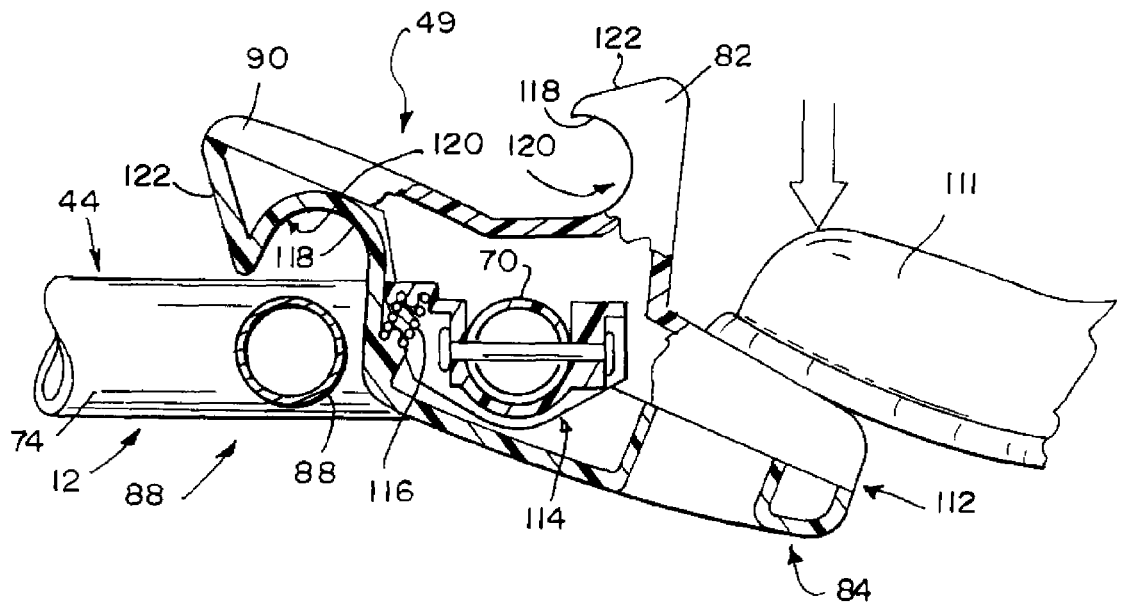
Figure 14:
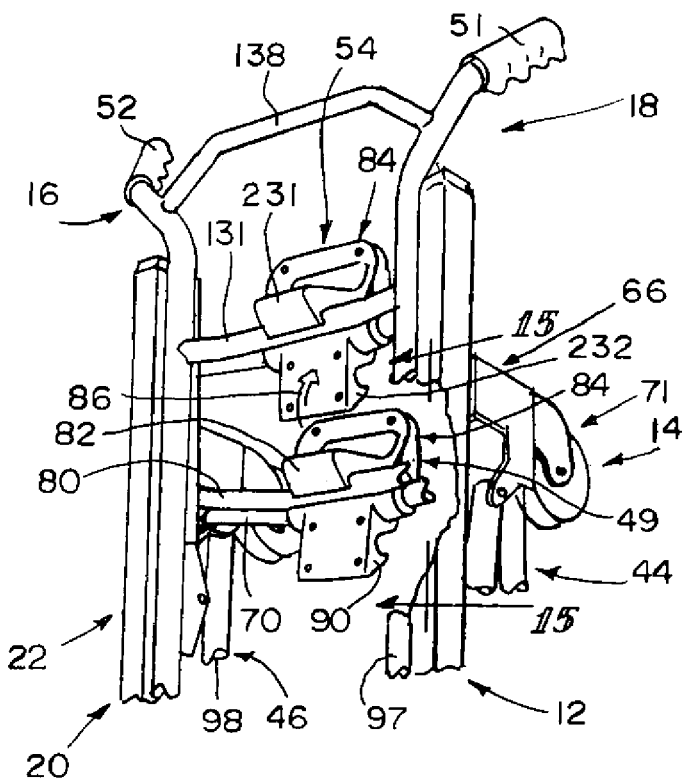
Figure 15:
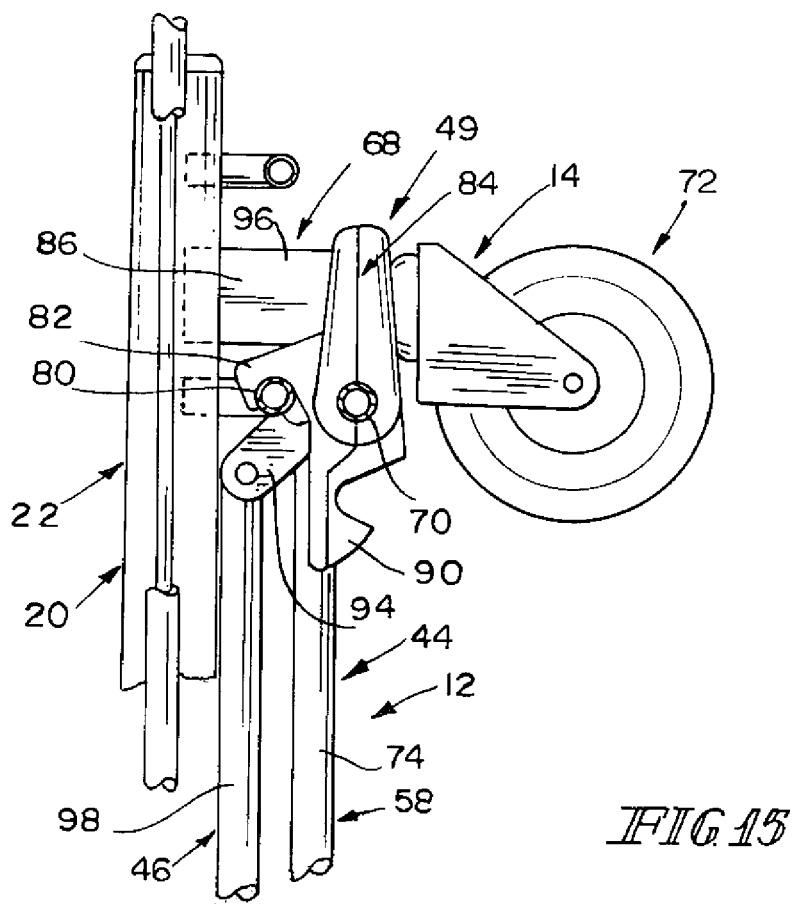
Figure 19:
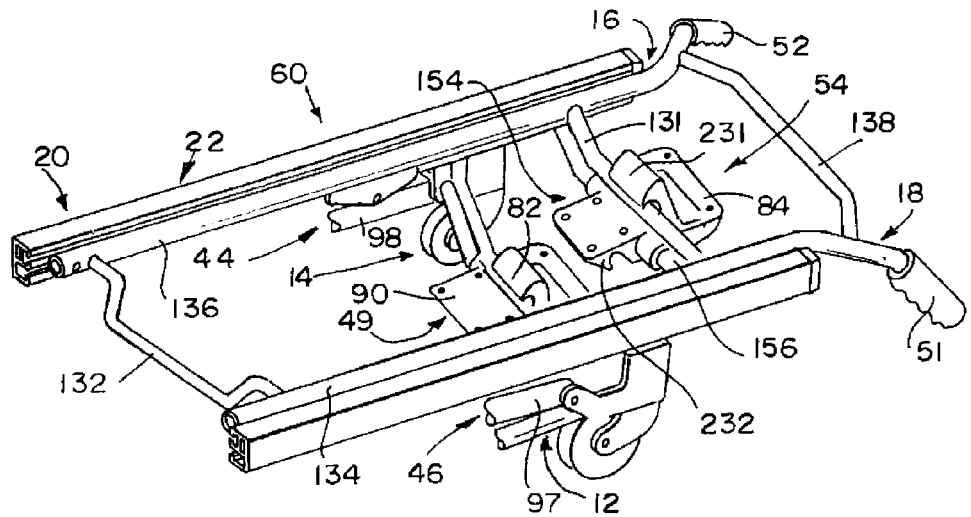
Figure 20:
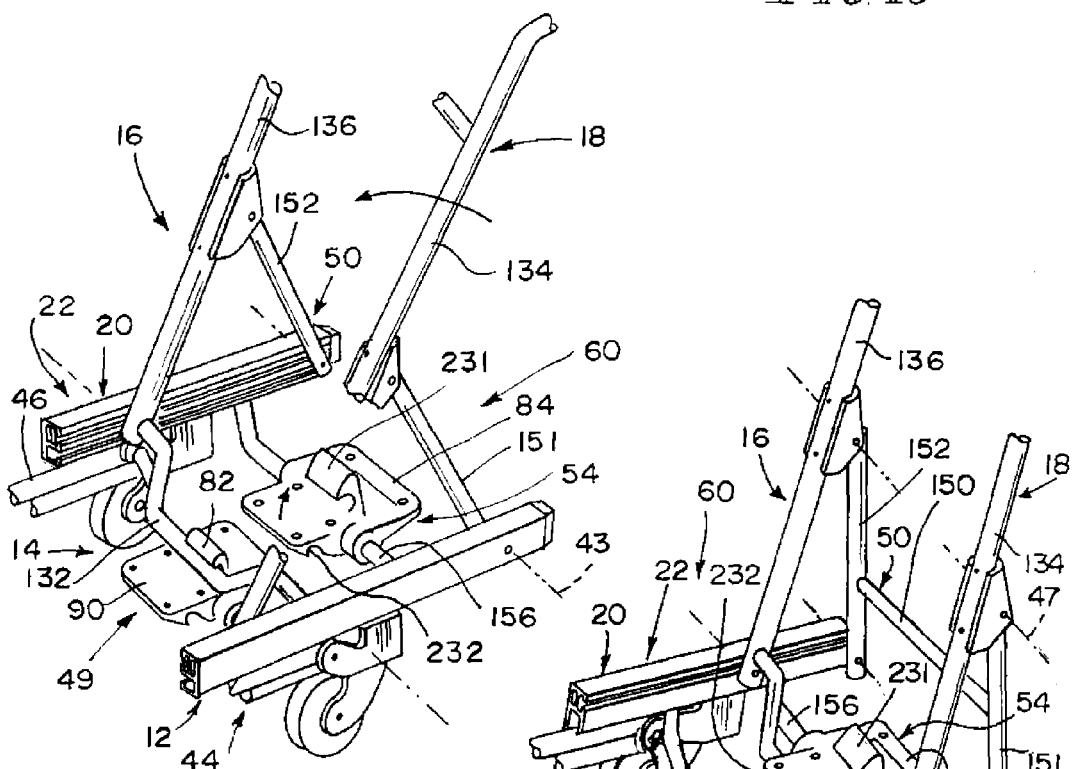
Figure 21:
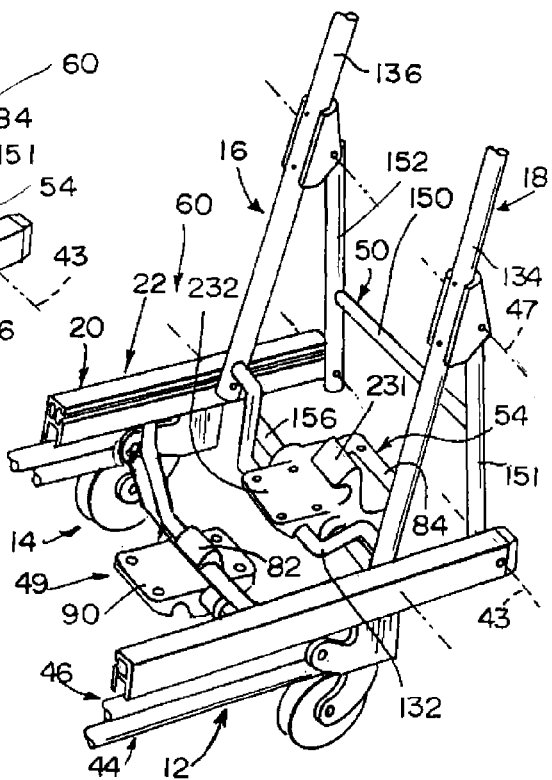

FIG. 4 is an exploded perspective assembly view of components included in the multi-mode hand truck of FIGS. 1-3 showing (1) a rolling base including a load carrier comprising a vertical truck frame and a horizontal toe-plate shelf coupled to the truck frame and also including a carrier wheel unit coupled to the load carrier, (2) a rolling load-carrier stabilizer that is adapted to be coupled to the load carrier and configured to include a foldable stabilizer frame that is configured to unfold as suggested in FIGS. 5-7 to establish the outrigger-wheel hand truck mode of the multi-mode hand truck shown in FIG. 2, and (3) a base pusher coupled to the load carrier and configured to unfold as suggested in FIGS. 16-18 and 19-21 to establish the push-cart mode of the multi-mode hand truck shown in FIG. 3;

FIG. 5 is a side elevation view of the multi-mode hand truck of FIG. 1;

FIG. 6 is a side elevation view similar to FIG. 5 showing unfolding of the foldable stabilizer frame of the rolling load-carrier stabilizer while the load carrier of the multi-mode hand truck remains in an upright orientation and showing that the rolling load-carrier stabilizer includes an outrigger wheel unit, an extensible wheel-support frame extending generally between the carrier wheel unit and the outrigger wheel unit, and a pivotable carrier-recline support link pivotably coupled to the load carrier and pivotably coupled to the extensible wheel-support frame;

FIG. 7 is a side elevation view similar to FIGS. 5 and 6 after unfolding of the foldable stabilizer frame of the rolling load-carrier stabilizer have been completed and the multi-mode hand truck has been converted to assume the outrigger-wheel mode;

FIG. 8 is an enlarged perspective view of the rolling load-carrier stabilizer, with portions broken away, showing the foldable stabilizer frame in the partly unfolded configuration shown in FIG. 6 and showing a frame lock unit mounted on a crossbar included in the extensible wheel-support frame and formed to include a hook-shaped foundation anchor and a separate upwardly extending hook-shaped carrier anchor;

FIG. 9 is an enlarged perspective view of the rolling base and the rolling load-carrier stabilizer, with portions broken away, in the outrigger-wheel mode of FIG. 7 showing that the hook-shaped foundation anchor of the frame lock unit has been mated with a foundation-anchor receiver (e.g., crossbar) coupled to an outrigger-wheel mount foundation included in the extensible wheel-support frame and coupled to the rolling base to keep the extensible wheel-support frame in a shortened configuration to retain the outrigger wheel unit of the rolling load-carrier stabilizer in an extended carrier-stabilizer position and establish the outrigger-wheel hand truck mode of the multi-mode hand truck;

FIG. 10 is an enlarged sectional view (taken generally along line 11-11 of FIG. 9) just before the foldable stabilizer frame of the rolling load-carrier stabilizer is unfolded fully and showing the foundation anchor of the frame lock unit before it mates with the foundation-anchor receiver (crossbar) coupled to the outrigger-wheel mount foundation of the extensible wheel-support frame;

FIG. 11 is an enlarged sectional view taken along line 11-11 of FIG. 9 showing the hook-shaped foundation anchor mated to the foundation-anchor receiver coupled to the outrigger-wheel mount foundation of the extensible wheel-support frame;

FIG. 12 is an enlarged sectional view taken along line 12-12 of FIG. 9 showing the hook-shaped foundation anchor mated to the foundation-anchor receiver coupled to the outrigger-wheel mount foundation of the extensible wheel-support frame;

FIG. 13 is a sectional view similar to FIG. 11 showing pivoting movement of the frame lock unit in a clockwise direction about a pivot axis to separate the hook-shaped foundation anchor from the foundation-anchor receiver to free the foldable stabilizer frame of the rolling load-carrier stabilizer for folding movement relative to the rolling base to cause the outrigger wheel unit to move from the extended load-carrier stabilizer position shown in FIGS. 2 and 7 to the retracted storage position shown in FIGS. 1 and 5;

FIG. 14 is a partial perspective view of the hand truck of FIG. 1 in the two-wheel hand truck mode showing that the hook-shaped carrier anchor of the frame lock unit has been mated with a carrier-anchor receiver (e.g. crossbar) coupled to the truck frame included in the load carrier to retain the outrigger wheel unit coupled to the folded foldable stabilizer frame of the rolling load-carrier stabilizer in a retracted storage position alongside the load carrier;

FIG. 15 is an enlarged sectional view taken along line 15-15 of FIG. 14 showing the hook-shaped carrier anchor of the frame lock unit mated to the truck frame crossbar while the nearby hook-shaped foundation anchor of the frame lock unit is unused;

FIG. 16 is a perspective view of the multi-mode hand truck of FIG. 1 after it has been pivoted rearwardly on the two larger wheels included in the carrier wheel unit to cause the two relatively smaller wheels included in the outrigger wheel unit to touch the ground underlying the rolling base (while the outrigger wheel unit of the rolling load-carrier stabilizer remains in the retracted storage position) to establish a supine orientation of the load carrier;

FIG. 17 is a side elevation view of the multi-mode hand truck of FIG. 16 showing unfolding of the base pusher while the load carrier of the multi-mode hand truck remains in the supine orientation and showing that the base pusher includes a push handle and a pivotable push-handle support link pivotably coupled to the load carrier and pivotably coupled to the push handle;

FIG. 18 is a side elevation view similar to FIG. 17 after unfolding of the base pusher has been completed and the multi-mode hand truck has been converted to assume the push-cart mode;

FIG. 19 is an enlarged perspective view of the multi-mode hand truck of FIG. 16, with portions broken away, showing a handle lock unit mounted on a crossbar included in the load carrier of the rolling base and formed to include a hook-shaped handle-extension anchor and a separate upwardly extending hook-shaped storage anchor and showing that the upwardly extending hook-shaped storage anchor has been mated with an upper anchor receiver (e.g., upper crossbar) coupled to the push handle to keep the push handle in a retracted truck-pusher position alongside the truck frame of the load carrier;

FIG. 20 is a partial perspective view of the multi-mode hand truck similar to FIG. 19 showing the base pusher in a partly unfolded configuration (similar to the view shown in FIG. 17) and showing movement of a lower anchor receiver (e.g., lower crossbar) coupled to the push handle in a direction toward the hook-shaped handle-extension anchor included in the handle lock unit;

FIG. 21 is a partial perspective view similar to FIG. 20 showing that the hook-shaped handle-extension anchor of the handle lock unit has been mated with the lower anchor receiver to retain the base pusher in an unfolded upright extended cart-pusher position and establish the push-cart mode of the multi-mode hand truck;

FIG. 22 is an enlarged sectional view taken along line 22-22 of FIG. 23 showing illustrative means for mounting the push handle to slide back and forth relative to the truck frame of the load carrier during movement of the base pusher between the retracted truck-pusher position shown in FIG. 19 and the unfolded upright extended cart-pusher position shown in FIG. 21;

FIG. 23 is an enlarged perspective view of a portion of the underside of the multi-mode hand truck of FIG. 19 showing a lug included in the outrigger-wheel mount and arranged to extend upwardly into a downwardly opening lug-receiving channel formed in the truck frame of the load carrier so as to limit lateral movement of the outrigger wheel unit relative to the truck frame; and FIG. 24 is an enlarged sectional view taken along line 24-24 of FIG. 23.

DETAILED DESCRIPTION

A multi-mode hand truck 10 is convertible in the field by a user to assume a two-wheel hand truck mode as suggested in FIGS. 1 and 5, an outrigger-wheel hand truck mode as suggested in FIGS. 2 and 7, and a push-cart mode as suggested in FIGS. 3 and 18. As suggested in FIGS. 5-7, a rolling load-carrier stabilizer 12 including an outrigger wheel unit 14 and an outrigger-wheel mover defined by, for example, a foldable stabilizer frame 15 that is coupled to outrigger wheel unit 14 and can be unfolded and locked in place to convert hand truck 10 from the two-wheel hand truck mode of FIG. 5 to the outrigger-wheel mode of FIG. 7. As suggested in FIGS. 16-18, hand truck 10 can be pivoted rearwardly about relatively larger carrier wheels 11 to cause outrigger wheel unit 14 to touch the underlying ground as suggested in FIG. 14 and then a base pusher 16 including a push handle 18 can be unfolded and locked in place to convert hand truck 10 from the two-wheel hand truck mode of FIG. 5 to the push-cart mode of FIG. 18.

Multi-mode hand truck 10 includes a rolling base 20, a rolling load-carrier stabilizer 12 coupled to rolling base 20, and a base pusher 16 coupled to rolling base 20 as shown in FIGS. 1-3 and suggested in FIG. 4. In an illustrative embodiment, rolling base 20 includes a load carrier 22 and a carrier wheel unit 24 configured to include carrier wheels 11 and coupled to load carrier 22 as suggested in FIG. 4. Foldable stabilizer frame 15 of rolling load-carrier stabilizer 12 is coupled to load carrier 22 of rolling base 20 and configured to fold and unfold to cause outrigger wheel unit 14 to move relative to load carrier 22 from a retracted storage position shown, for example, in FIGS. 1, 5, and 16 to an extended carrier-stabilizer position shown, for example, in FIGS. 2 and 7. Base pusher 16 is also coupled to load carrier 22 of rolling base 20 and configured to fold and unfold to move relative to load carrier 22 from a retracted truck-pusher position shown, for example, in FIGS. 1, 2, 5, 7, 16, and 19 to an extended cart-pusher position shown, for example, in FIGS. 3, 18, and 21.

Load carrier 22 of rolling base 20 includes a truck frame 26 and a toe-plate shelf 28 coupled to a lower end of truck frame 26 as shown, for example, in FIG. 4. Truck frame 26 includes first and second upright rails 31, 32 and a frame-rigidifying structure 30 of any suitable size and shape coupled to first and second upright rails 31, 32 as suggested in FIG. 4. Frame-rigidifying structure 30 is arranged to lie between first and second upright rails in the illustrated embodiment. Truck frame 26 also includes a first axle mount 34 coupled to first upright rail 31 and a second axle mount 36 coupled to second upright rail 32. Rails 31, 32 are arranged to lie between axle mounts 34, 36 in the illustrated embodiment.

Carrier wheel unit 24 includes an axle 38 and a carrier wheel 11 adapted to be coupled to each end of axle 38 as suggested in FIG. 4. Carrier wheel unit 24 is coupled to load carrier 22 and configured to provide means for supporting load carrier 22 on underlying ground 39 when multi-mode hand truck 10 is used in any of the three modes illustrated in FIGS. 1-3. In the illustrated embodiment, axle 38 is coupled to first and second axle mounts 34, 36 and configured to support carrier wheels 11 to spin freely about an axis of rotation 40 defined by axle 38 as suggested in FIG. 4.

Rolling load-carrier stabilizer 12 includes outrigger wheel unit 14 and a foldable stabilizer frame 15 comprising an extensible wheel-support frame 44 and a pivotable carrier-recline support link 46 as suggested in FIGS. 2, 4, and 5-7. Outrigger wheel unit 14 is coupled to at least one of extensible wheel-support frame 44 and pivotable carrier-recline support link 46 so that outrigger wheel unit 14 moves relative to load carrier 22 as suggested in FIGS. 5-7 during movement of extensible wheel-support frame 44 and pivotable carrier-recline support link 46 relative to load carrier 22.

Extensible wheel-support frame 44 is coupled to load carrier 22 for pivotable movement about a first carrier pivot axis 41 as suggested in FIGS. 4-7. Extensible wheel-support frame 44 is configured to vary in length during pivoting movement about first carrier pivot axis 41 as shown, for example, in FIGS. 5-7. Extensible wheel-support frame 44 is coupled to outrigger wheel unit 14 as suggested in FIG. 4 to cause outrigger wheel unit 14 to pivot about first carrier pivot axis 41 during folding and unfolding of foldable stabilizer frame 15 of rolling load-carrier stabilizer 12 as suggested in FIGS. 5-7.

Pivotable carrier-recline support link 46 is coupled to load carrier 22 for pivotable movement about a second carrier pivot axis 42 and to extensible wheel-support frame 44 for pivotable movement about a frame mount pivot axis 45 during pivoting movement about second carrier pivot axis 42 as suggested in FIGS. 4-7. Extensible wheel-support frame 44 is lengthened or shortened during pivoting movement of pivotable carrier-recline support link 46 about second carrier pivot axis 42 and frame mount pivot axis 43 as suggested in FIGS. 1, 2, and 5-7.

Extensible wheel-support frame 44 and pivotable carrier-recline support link 46 cooperate to define a foldable stabilizer frame 15 configured to provide outrigger-wheel deployment means for moving outrigger wheel unit 14 from a retracted storage position located (1) in close proximity to load carrier 22 and (2) away from ground 39 underlying and engaging carrier wheel unit 24 as shown, for example, in FIGS. 1 and 5 to an extended carrier-stabilizer position as shown, for example, in FIGS. 2 and 7. In the extended carrier-stabilizer position, outrigger wheel unit 14 is located (1) in spaced-apart relation to load carrier 22 and (2) in contact with ground 39 underlying and engaging carrier wheel unit 24 as suggested in FIG. 7. Outrigger wheel unit 14 moves from the retracted storage position to the extended carrier-stabilizer position in response to movement of outrigger wheel unit 14 in an inward direction 48 toward carrier wheel unit 24 as suggested in FIGS. 5-7. Rolling load-carrier stabilizer 12 cooperates with rolling base 20 to establish (1) a two-wheel hand truck mode of hand truck 10 when outrigger wheel unit 14 occupies the retracted storage position as suggested in FIGS. 1 and 5 and (2) an outrigger-wheel hand truck mode of hand truck 10 when outrigger wheel unit 14 occupies the extended carrier-stabilizer position as suggested in FIGS. 2 and 7.

Extensible wheel-support frame 44 includes an outrigger-wheel mount 56 coupled to outrigger wheel unit 14 and an outrigger-wheel mount foundation 58 pivotably coupled to load carrier 22 at first carrier pivot axis 41. Outrigger-wheel mount 56 is mounted for movement relative to outrigger-wheel mount foundation 58 to vary the length of extensible wheel-support frame 44 as suggested in FIGS. 1-3 and 5-7.

A frame lock unit 49 included in rolling load-carrier stabilizer 12 is coupled to outrigger-wheel mount 56 for movement therewith and configured to lock outrigger-wheel mount 56 to outrigger-wheel mount foundation 58 to establish a shortened extensible wheel-support frame 44 when outrigger wheel unit 14 occupies the extended carrier-stabilizer position as shown, for example, in FIGS. 7 and 9. Frame lock unit 49 can also be used to lock extensible wheel-support frame 44 to load carrier 22 to establish a lengthened extensible wheel-support frame 44 when outrigger wheel unit 14 occupies the retracted storage position as shown, for example, in FIGS. 1 and 5.

Base pusher 16 includes push handle 18 and a pivotable push-handle support link 50 as suggested in FIGS. 4, 16-18, and 19-21. Push handle 18 includes an upper end providing a pair of hand grips 51, 52 and a lower end including means for mating with load carrier 22 during (e.g., sliding) movement of push handle 18 relative to load carrier 22 from a retracted truck-pusher position oriented to lie between rails 31, 32 of load carrier 22 shown in FIGS. 1, 2, 5, 7, 16, and 19 to an extended cart-pusher position oriented to lie at a nearly perpendicular angle to rails 31, 32 of load carrier 22 shown in FIGS. 3, 18, and 21. Pivotable push-handle support link 50 is coupled to load carrier 22 for pivotable movement about a third carrier pivot axis 43 and to push handle 18 for pivotable movement about a handle mount pivot axis 47 during pivoting movement about third carrier pivot axis 43 as suggested in FIGS. 4, 16-18, and 19-21.

To establish the push-cart mode of multi-mode hand truck 10 shown in FIG. 3, hand truck 10 first is pivoted from the upright orientation shown in FIG. 1 to the horizontal supine orientation shown in FIGS. 16 and 19 to provide a push cart 60. Then push handle 18 is moved relative to load carrier 22 of push cart 60 as suggested in FIGS. 17 and 20 until push handle 18 reaches the extended cart-pusher position shown in FIGS. 3, 18, and 21. Push handle 18 is supported in this extended cart-pusher position by pivotable push-handle support link 50 and locked in this position as shown, for example, in FIG. 21 by means of a handle lock unit 52 coupled to load carrier 22. Handle lock unit 52 can also be used to lock push handle 18 in the retracted truck-pusher position as shown, for example, in FIG. 19.

Returning now to FIG. 4, outrigger-wheel mount 56 includes, in an illustrative embodiment, a wheel support 64, a first mount leg 61 coupled to one end of wheel support 64, and a second mount leg 62 coupled to another end of wheel support 64. Outrigger wheel unit 14 is coupled to wheel support 64 to move therewith as suggested in FIGS. 4-7. Wheel support 64 illustratively includes a first corner block 66 coupled to first mount leg 61, a second corner block 68 coupled to second mount leg 62, and a crossbar 70 arranged to interconnect first and second corner blocks 66, 68 and extend between first and second mount legs 61, 62 as shown, for example, in FIGS. 4 and 8.

Outrigger wheel unit 14 includes a first outrigger wheel 71 coupled to first corner block 66 and a second outrigger wheel 72 coupled to second corner block 68 as shown, for example, in FIGS. 4 and 8. Each of outrigger wheels 71, 72 contact ground 39 underlying load carrier 22 when multi-mode hand truck 10 is in the outrigger-wheel hand truck mode as shown in FIG. 2 and in the push-cart mode as shown in FIG. 18. It is within the scope of this disclosure to configure outrigger wheel unit 14 to include only one outrigger wheel. In the illustrated embodiment, frame lock unit 49 is mounted on crossbar 70 and arranged to lie in a space provided between first and second outrigger wheels 71, 72. In the illustrated embodiment, each of outrigger wheels 71, 72 includes a castor mount coupled to one of the corner blocks 66, 68 and an associated castor.

Outrigger-wheel mount foundation 58 includes, in an illustrative embodiment, a first foundation leg 74, a second foundation leg 76, and at least one crossbar 78 arranged to interconnect first and second foundation legs 74, 76. First foundation leg 74 is pivotably coupled to first axle mount 34 at first carrier pivot axis 41. Second foundation leg 76 is pivotably coupled to second axle mount 36 at first carrier pivot axis 41. As suggested in FIG. 4, first carrier pivot axis 41 is arranged to lie in close proximity and spaced-apart parallel relation to rotation axis 40 established by axle 38.

In an illustrative embodiment, each of first and second foundation legs 74, 76 is formed to include a leg-receiving passageway along its length as suggested in FIG. 4. First mount leg 61 is received telescopically in the leg-receiving passageway formed in first foundation leg 74 and second mount leg 62 is received telescopically in the leg-receiving passageway formed in second foundation leg 76 to mount outrigger-wheel mount 56 for reciprocating, sliding, and telescoping movement on outrigger-wheel mount foundation 58 so that the length of extensible wheel-support frame 44 varies during movement of outrigger wheel unit 14 from the retracted storage position alongside load carrier 22 to the extended-carrier stabilizer position away from load carrier 22 as suggested in FIGS. 5-7.

Rolling load-carrier stabilizer 12 further includes frame position-retainer means 81 (see FIG. 4) for selectively keeping extensible wheel-support frame 44 in one of a lengthened position arranged to lie alongside load carrier 22 upon movement of outrigger wheel unit 14 to assume the retracted storage position to retain outrigger wheel unit 14 in the retracted storage position to establish and maintain the two-wheel hand truck mode as suggested in FIGS. 1 and 5 and a shortened position arranged to lie at an angle to load carrier 22 upon movement of outrigger wheel unit 14 to assume the extended carrier-stabilizer position to retain outrigger wheel unit 14 in the extended carrier-stabilizer position and establish and maintain the outrigger-wheel hand truck mode as suggested in FIGS. 2 and 7.

Frame position-retainer means 81 includes a carrier-anchor receiver 80 coupled to load carrier 22 and a frame lock unit 49 coupled to extensible wheel-support frame 44. Frame lock unit 49 includes a load-carrier anchor 82 and an anchor mover 84. Load-carrier anchor 82 is configured to mate with carrier-anchor receiver 80 upon movement of extensible wheel-support frame 44 to the lengthened position arranged to lie alongside load carrier 22 to block movement of outrigger wheel unit 14 away from the retracted storage position as suggested in FIGS. 14 and 15. Anchor mover 84 is coupled to extensible wheel-support frame 44 and configured to provide means for moving load-carrier anchor 82 relative to carrier-anchor receiver 80 in direction 86 to separate from carrier-anchor receiver 80 to free extensible wheel-support frame 44 to move from the lengthened position toward the shortened position as suggested in FIGS. 14 and 15. In the illustrated embodiment, carrier-anchor receiver 80 is a crossbar arranged to interconnect first and second upright rails 31, 32 of truck frame 26 of load carrier 22 as shown best in FIGS. 4 and 14.

Frame position-retainer means 81 also includes a foundation-anchor receiver 88 coupled to outrigger-wheel mount foundation 58 and frame lock unit 49. Frame lock unit 49 includes a foundation anchor 90 in addition to load-carrier anchor 82 and anchor mover 84. Foundation anchor 90 is configured to mate with foundation-anchor receiver 88 as shown best in FIGS. 9 and 11 upon movement of outrigger-wheel mount 56 relative to outrigger-wheel mount foundation 58 to shorten the length of extensible wheel-support frame 44 to block relative movement of outrigger-wheel mount 56 and outrigger-wheel mount foundation 58 and retain outrigger wheel unit 14 in the extended carrier-stabilizer position to maintain the outrigger-wheel hand truck mode. In the illustrated embodiment, foundation-anchor receiver 88 is a crossbar arranged to interconnect first and second foundation legs 71, 72 as shown best in FIGS. 4 and 8.

Anchor mover 84 is coupled to crossbar 70 of outrigger-wheel mount 56 as suggested in FIGS. 4 and 8-11. Anchor mover 84 is configured to provide means for moving foundation anchor 90 relative to foundation-anchor receiver 88 (e.g. crossbar 88) to separate from foundation-anchor receiver 88 as suggested in FIGS. 12 and 13 to free outrigger-wheel mount 56 to move (e.g. slide back and forth) relative to outrigger wheel-mount foundation 56. Likewise, as is apparent from FIGS. 14 and 15, anchor mover 84 is configured to provide means for moving load-carrier anchor 82 relative to carrier-anchor receiver 80 (e.g. crossbar 80) to separate from carrier-anchor receiver 80 to free extensible wheel-support frame 44 to move relative to load carrier 22.

Pivotable carrier-recline support link 46 includes first and second support legs 97, 98 and a crossbar 99 as suggested in FIG. 4. Link 46 is configured to pivot (or otherwise move relative to load carrier 22 and extensible wheel-support frame 44) to support load carrier 22 in a reclined position as suggested in FIGS. 2 and 7. First and second support legs 97, 98 are arranged to lie in spaced-apart parallel relation to one another. Crossbar 99 is arranged to interconnect and extend between first and second support legs 97, 98. First support leg 97 is pivotably coupled to first upright rail 31 at second carrier pivot axis 42 and is pivotably coupled to first corner block 66 at frame mount pivot axis 45. Second support leg 98 is pivotably coupled to second upright rail 32 at second carrier pivot axis and is pivotably coupled to second corner block 68 at frame mount pivot axis 45.

As suggested in FIGS. 4, 8, and 9, each corner block 66, 68 (included in wheel support 64 of outrigger-wheel mount 56 of extensible wheel-support frame 44) includes a wheel mount 92, a link mount 94 arranged to extend at an angle to wheel mount 92, and a motion-limiter lug 96 arranged to extend upwardly from wheel mount 92. In the illustrated embodiment, outrigger wheel 71 is coupled to wheel mount 92 of first corner block 66 and outrigger wheel 72 is coupled to wheel mount 92 of second corner block 68. First support leg 97 is pivotably coupled to link mount 94 of first corner block 66 at frame mount pivot axis 45 and second support leg 98 is coupled to link mount 94 of second corner block 68 at frame mount pivot axis 45.

As suggested in FIGS. 23 and 24, first upright rail 31 of truck frame 26 is formed to include a lug-receiver channel 101 opening toward outrigger-wheel mount 56 upon movement of outrigger wheel unit 14 to assume the retracted storage position. Motion-limiter lug 96 of first corner block 66 is arranged to extend into lug-receiver channel 101 upon movement of outrigger wheel unit 14 to assume the retracted storage position to limit lateral movement (e.g. in directions 104, 106) of outrigger wheel unit 14 relative to truck frame 26. Likewise, motion-limiter lug 96 of second corner block 68 is arranged to extend into a lug-receiver channel 102 formed in second upright rail 32 and arranged to open toward outrigger-wheel mount 56 upon movement of outrigger wheel unit 14 to assume the retracted storage position. Extension of motion-limiter lugs 96 into companion lug-receiver channels 101, 102 cooperates to define means for limiting lateral movement of load carrier 22 relative to outrigger wheel unit 14 when multi-mode hand truck 10 is configured to assume the push-cart mode illustrated in FIGS. 3, 18, and 21.

An illustrative embodiment of frame lock unit 49 is shown in FIGS. 12 and 13. Carrier lock unit 54 has a similar construction.

Frame lock unit 49 includes a frame position lock 110 comprising load-carrier anchor 82 and foundation anchor 90 as suggested in FIGS. 12 and 13. Frame lock unit 49 also includes an anchor mover 84 comprising a lock-release handle 112, a mount-leg connector 114, and a return spring 116 as shown, for example, in FIGS. 12 and 13. A user 111 (e.g., foot) can operate anchor mover 84 to cause foundation anchor 90 to disengage foundation-anchor receiver (crossbar) 88 as suggested in FIG. 13 (or to cause load-carrier anchor 82 to disengage carrier-anchor receiver (crossbar) 80).

Each of foundation anchor 90 and load-carrier anchor 82 includes a concave wall 118 and a cam wall 122 as suggested in FIG. 13. Concave wall 118 defines a notch 120 sized to receive a companion crossbar 88 or 80 therein. Cam wall 122 defines ramp means for pivoting frame position lock 110 relative to crossbar 70 (about a central longitudinal axis of crossbar 70) during mating engagement of foundation anchor 90 and companion foundation-anchor receiver (crossbar) 88 (as suggested in FIGS. 10 and 11) or load-carrier anchor 82 and companion carrier-anchor receiver (crossbar) 80.

Mount-leg connector 114 is coupled to lock-release handle 112. Mount-leg connector 114 is coupled to crossbar 70 to support lock-release handle 112 for pivotable movement about the central longitudinal axis of crossbar 70 as suggested in FIGS. 12 and 13.

Return spring 116 is interposed between mount-leg connector 114 and frame position lock 110 as suggested in FIGS. 12 and 13. Return spring 116 is a coiled compression spring in the illustrated embodiment. Return spring 116 is configured and arranged to provide means for yieldably moving frame position lock 110 to a crossbar-mating position as shown, for example, in FIG. 12 from a crossbar-releasing position as shown, for example, in FIG. 13 once an operator releases lock release handle 112.

In use, user 111 can operate frame lock unit 49 to unlock foldable stabilizer frame 15 of rolling load carrier stabilizer 12 so that it can be unfolded relative to load carrier 20 as suggested in FIGS. 5 and 6. Once foldable stabilizer frame 15 of rolling load-carrier stabilizer 12 is unfolded fully as shown in FIG. 7, frame lock unit 49 (using, for example, return spring 116) functions automatically to mate with a companion crossbar 88 to retain hand truck 10 in the outrigger-wheel hand truck mode. Similarly, frame lock unit 49 functions automatically to mate with a companion crossbar 80 to retain hand truck 10 in the two-wheel hand truck mode when foldable stabilizer frame 15 of rolling load-carrier stabilizer 12 is folded fully.

Turning now to FIG. 19 for a discussion of push cart 60 and base pusher 16, in illustrative embodiments, base pusher 16 includes push handle 18, a first anchor receiver 131 coupled to push handle 18, and a second anchor receiver 132 coupled to push handle 18. Push handle 18 includes a first leg 134 coupled to first hand grip 51, a second leg 136 coupled to second hand grip 52, and a top crossbar 138 coupled to top portions of legs 134, 136 to lie near handgrips 51, 52.

Second anchor receiver 132 is arranged to lie in spaced-apart location to top crossbar 138 (and handgrips 51, 52) to locate first anchor receiver 131 therebetween as shown, for example, in FIGS. 4 and 19. In the illustrated embodiment, first anchor receiver 131 is a crossbar arranged to interconnect and extend between first and second legs 134, 136 of push handle 18. Also, second anchor receiver 132 is a somewhat U-shaped crossbar arranged to interconnect and extend between first and second legs 134, 136 of push handle 18.

Push handle 18 also includes a first post 141 coupled to a lower end of first leg 134 and a second post 142 coupled to a lower end of second leg 136 as shown best in FIG. 4. First post 141 is arranged to extend away from second anchor receiver (crossbar) 132 and into a first post-guide channel 143 formed in first upright rail 31 of load carrier 22 as suggested in FIGS. 4 and 17. Similarly, second post 142 is arranged to extend away from second anchor receiver (crossbar) 132 and into a second post-guide channel 144 formed in second upright rail 32 of load carrier 22. Posts 141, 142 are configured to slide back and forth in companion post-guide channels 143, 144 as suggested in FIGS. 16-18 and FIGS. 19-22 to control relative movement of base pusher 16 relative to push cart 60 as the mode of multi-mode hand truck 10 is changed.

Pivotable push-handle support link 50 illustratively includes first and second support legs 151, 152 and a crossbar 150 as suggested in FIGS. 4 and 21. First and second support legs 151, 152 are arranged to lie in spaced-apart parallel relation to one another. Crossbar 150 is arranged to interconnect and extend between first and second support legs 151, 152. First support leg 151 is pivotably coupled to first leg 134 of push handle 18 at handle mount pivot axis 47 and is pivotably coupled to first upright rail 31 of load carrier 22 at third carrier pivot axis 43. Second support leg 152 is pivotably coupled to second leg 136 of push handle 18 at handle mount pivot axis 47 and is pivotably coupled to second upright rail 32 of load carrier 22 at third carrier pivot axis 43.

As suggested in FIGS. 19-21, carrier lock unit 54 includes a handle position lock 154 comprising a first anchor 231 and a second anchor 232 along with anchor mover 84 coupled to handle position lock 154. Anchor mover 84 is mounted on a cross bar 156 included in hand truck 26 an arranged to interconnect and extend between first and second upright rails 31, 32 as suggested in FIG. 4.

Rolling base 20 is oriented to cause a carrier wheel 11 included in carrier wheel unit 24 to engage ground 39 underlying carrier wheel unit 24 and an outrigger wheel (71 or 72) included in outrigger wheel unit 14 to engage ground 39 while frame position-retainer means 81 keeps extensible wheel-support frame 44 in the lengthened position to establish a push cart 60 as shown, for example, in FIGS. 16 and 19 comprising a base pusher 16 coupled to load carrier 22 of rolling base 20. Base pusher 16 including a push handle 18 and handle position-retainer means 181 for selectively keeping push handle 18 in a retracted truck-plusher position arranged to lie alongside load carrier 22 during configuration of rolling load-carrier stabilizer 12 to establish the two-wheel hand truck mode as suggested in FIG. 1 and also to establish the outrigger-wheel hand truck mode as suggested in FIG. 2 and an extended cart-pusher position arranged to extend upwardly away from load carrier 22 and outrigger wheel unit 14 to establish the push-cart mode as suggested in FIG. 3.

Handle position-retainer means 181 includes a first anchor receiver 131 coupled to push handle 18, a second anchor receiver 132 coupled to push handle 18, and a handle lock unit 54 coupled to load carrier 22. Handle lock unit 54 includes a first anchor 231 configured to mate with first anchor receiver 131 upon movement of push handle 18 to the retracted truck-pusher position as shown in FIGS. 1, 2, and 19, a second anchor 232 configured to mate with second anchor receiver 132 upon movement of push handle 18 to the extended cart-pusher position as shown in FIGS. 3 and 21, and an anchor mover 84 coupled to first and second anchors 231, 232 and to load carrier 22. Anchor mover 84 is configured to provide mans for separating first anchor 231 from first anchor receiver 131 and second anchor 232 from second anchor receiver 132 to free push handle 18 for movement relative to load carrier 18 between the retracted truck-pusher position and the extended cart-pusher position.

Push handle 18 includes an inner end (e.g., 141 or 142) coupled to load carrier 22 for sliding movement in a channel (e.g., 101 or 102, respectively) formed in load carrier 22. Base pusher 16 further includes a pivotable push-handle support link 50 coupled at one end thereof to load carrier 22 for pivotable movement about a third carrier pivot axis 43 and at another end thereof to push handle 18 for pivotable movement about a handle mount pivot axis 47 arranged on lie between first and second anchor receivers 131, 132 as suggested in FIG. 4. Pivotable push-handle support link 50 is configured to pivot about third carrier pivot axis 43 and handle mount pivot axis 47 during movement of push handle 18 between the retracted truck-pusher position and the extended cart-pusher position.

In use, a user can operate handle lock unit 54 (in a manner similar to frame lock unit 49) to unlock push handle 18 so that it can be moved between a retracted truck-pusher position shown in FIGS. 1, 2, 5-7, 16, and 19 and an extended cart-pusher position shown in FIGS. 3, 18, and 21. Handle lock unit 54 functions automatically (using, for example, return spring 116) to mate with first anchor receiver (crossbar) 131 in the retracted truck-pusher position and with second anchor receiver (crossbar) 132 in the extended cart-pusher position.

Multi-mode hand truck 10 converts easily between three modes of operation shown, for example, in FIGS. 1-3. In a two-wheel hand truck mode, foldable stabilizer frame 15 is locked in a folded position and push handle 18 is locked in a retracted position as shown in FIG. 1. In an outrigger-wheel hand truck mode, foldable stabilizer frame 15 is locked in an unfolded position and push handle 18 is locked in the retracted position as shown in FIG. 2. In a push-cart mode, foldable stabilizer frame 15 is locked in a folded position, load carrier 22 is pivoted to assume a supine orientation to establish push cart 60, and push handle 18 is locked in an upright position as shown in FIG. 3.

To convert from two-wheel hand truck mode to outrigger-wheel hand truck mode, a user releases frame lock unit 49 and foldable stabilizer frame 15 unfolds to move outrigger wheel unit 14 to assume an extended carrier-stabilizer position. Frame lock unit 49 then locks foldable stabilizer frame 15 in that new position. This allows the user to move heavy objects by tilting back the load on reclined load carrier 22 yet allows carrier wheels 11 and outrigger wheels 71, 72 to carry the weight.

To convert from two-wheel hand truck mode to push-cart mode, the hand truck is tilted backwardly to assume a supine position wherein all carrier wheels 11 and outrigger wheels 71, 72 engage ground 39 underlying hand truck 10 to provide a push cart 60. Then user operates handle lock unit 54 to release push handle 18 so that push handle 18 can be slid along load carrier 22 until push handle 18 assumes a nearly upright position and handle lock unit 54 locks push handle 18 in this position. This allows the user to stack larger loads on the now-horizontal load carrier 22 (rather than toe-plate shelf 28) and move those loads on push cart 60 using an upright push handle 18 as suggested in FIG. 3.

The invention claimed is:

1. A multi-mode hand truck comprising
   a rolling base including a load carrier and a carrier wheel unit coupled to the load carrier
   a rolling load-carrier stabilizer including an outrigger wheel unit and outrigger-wheel deployment means for moving the outrigger wheel unit from a retracted storage position located in close proximity to the load carrier and away from ground underlying and engaging the carrier wheel unit and arranged to cause the rolling load-carrier stabilizer to cooperate with the rolling base to establish a two-wheel hand truck mode to an extended carrier-stabilizer position located in spaced-apart relation to the load carrier and in contact with ground underlying and engaging the carrier wheel unit and arranged to cause the rolling load-carrier stabilizer to cooperate with the rolling base to establish an outrigger-wheel hand truck mode in response to movement of the outrigger wheel unit in an inward direction toward the carrier wheel unit
   wherein the outrigger-wheel deployment means includes an extensible wheel-support frame coupled to the outrigger wheel unit and the extensible wheel-support frame is also coupled to the load carrier for pivotable movement about a first carrier pivot axis and is configured to vary in length to vary distance between the outrigger wheel unit and the carrier wheel unit during movement of the outrigger wheel unit between the retracted storage position and the extended carrier-stabilizer position and the carrier wheel unit and
   wherein the outrigger-wheel deployment means further includes a pivotable carrier-recline support link coupled at one end thereof to the load carrier for pivotable movement about a second carrier pivot axis and at another end thereof to the extensible wheel-support frame for pivotable movement about a frame mount pivot axis and wherein the pivotable carrier-recline support link is configured to pivot about the second carrier pivot axis and the frame mount pivot axis during movement of the outrigger wheel unit between the retracted storage position and the extended carrier-stabilizer position and to provide means for supporting the load carrier in a reclined position relative to the extensible wheel-support frame in response to movement of the outrigger wheel unit to the extended carrier-stabilizer position.

2. The multi-mode hand truck of claim 1, wherein the extensible wheel-support frame includes an outrigger-wheel mount coupled to an end of the pivotable carrier-recline support link at the frame mount pivot axis and to the outrigger wheel unit and an outrigger-wheel mount foundation pivotably coupled to the load carrier at the first carrier pivot axis and coupled to the outrigger-wheel mount for sliding movement relative thereto to vary the length of the extensible wheel-support frame during movement of the outrigger wheel unit between the retracted storage position and the extended carrier-stabilizer position to cause the extensible wheel-support frame to assume a short length when the outrigger wheel unit occupies the retracted storage position and to assume a relatively longer length when the outrigger wheel unit occupies the extended carrier-stabilizer position.

3. The multi-mode hand truck of claim 1, wherein the rolling load-carrier stabilizer further includes frame position-retainer means for selectively keeping the extensible wheel-support frame in one of a lengthened position arranged to lie alongside the load carrier upon movement of the outrigger wheel unit to assume the retracted storage position to retain the outrigger wheel unit in the retracted storage position to establish and maintain the two-wheel hand truck mode and a shortened position arranged to lie at an angle to the load carrier upon movement of the outrigger wheel unit to assume the extended carrier-stabilizer position to retain the outrigger wheel unit in the extended carrier-stabilizer position and establish and maintain the outrigger-wheel hand truck mode.

4. The multi-mode hand truck of claim 3, wherein the frame position-retainer means includes a carrier-anchor receiver coupled to the load carrier and a frame lock unit coupled to the extensible wheel-support frame and the frame lock unit includes a load-carrier anchor and an anchor mover, the load-carrier anchor is configured to mate with the carrier-anchor receiver upon movement of the extensible wheel-support frame to the lengthened position arranged to lie alongside the load carrier to block movement of the outrigger wheel unit away from the retracted storage position, and the anchor mover is coupled to the extensible wheel-support frame and configured to provide means for moving the load-carrier anchor relative to the carrier-anchor receiver to separate from the carrier-anchor receiver to free the extensible wheel-support frame to move from the lengthened position toward the shortened position.

5. The multi-mode hand truck of claim 3, wherein the extensible wheel-support frame includes an outrigger-wheel mount foundation pivotably coupled to the load carrier at the first carrier pivot axis and an outrigger-wheel mount coupled to the outrigger wheel unit and mounted to move on and relative to the outrigger-wheel mount foundation to cause the outrigger wheel unit to move in the inward direction toward the carrier wheel unit during movement of the outrigger wheel unit from the retracted storage position to the extended carrier-stabilizer position and wherein the frame position-retainer means includes a foundation-anchor receiver coupled to the outrigger-wheel mount foundation and a frame lock unit coupled to the outrigger-wheel mount, the frame lock unit includes a foundation anchor and an anchor mover, the foundation anchor is configured to mate with the foundation-anchor receiver upon movement of the outrigger-wheel mount relative to the outrigger-wheel mount foundation to shorten the length of the extensible wheel-support frame to block relative movement of the outrigger-wheel mount and the outrigger-wheel mount foundation and retain the outrigger wheel unit in the extended carrier-stabilizer position to maintain the outrigger-wheel hand truck mode.

6. The multi-mode hand truck of claim 3, wherein the rolling base is oriented to cause a carrier wheel included in the carrier wheel unit to engage the ground underlying the carrier wheel unit and an outrigger wheel included in the outrigger wheel unit to engage the ground while the frame position-retainer means keeps the extensible wheel-support frame in the lengthened position to establish a push cart and further comprising a base pusher coupled to the load carrier of the rolling base, the base pusher including a push handle and handle position-retainer means for selectively keeping the push handle in a retracted truck-pusher position arranged to lie alongside the load carrier during configuration of the rolling load-carrier stabilizer to establish the two-wheel hand truck mode and also to establish the outrigger-wheel hand truck mode and an extended cart-pusher position arranged to extend upwardly away from the load carrier and the outrigger wheel unit to establish the push-cart mode.

7. The multi-mode hand truck of claim 6, wherein the handle position-retainer means includes a first anchor receiver coupled to the push handle, a second anchor receiver coupled to the push handle, and a handle lock unit coupled to the load carrier, the handle lock unit includes a first anchor configured to mate with the first anchor receiver upon movement of the push handle to the retracted truck-pusher position, a second anchor configured to mate with the second anchor receiver upon movement of the push handle to the extended cart-pusher position, and an anchor mover coupled to the first and second anchors and to the load carrier and configured to provide means for separating the first anchor from the first anchor receiver and the second anchor from the second anchor receiver to free the push handle for movement relative to the load carrier between the retracted truck-pusher position and the extended cart-pusher position.

8. The multi-mode hand truck of claim 7, wherein the push handle includes an inner end coupled to the load carrier for sliding movement in a channel formed in the load carrier and the base pusher further includes a pivotable push-handle support link coupled at one end thereof to the load carrier for pivotable movement about a third carrier pivot axis and at another end thereof to the push handle for pivotable movement about a handle mount pivot axis arranged to lie between the first and second anchor receivers and wherein the pivotable push-handle support link is configured to pivot about the third carrier pivot axis and the handle mount pivot axis during movement of the push handle between the retracted truck-pusher position and the extended cart-pusher position.

9. The multi-mode hand truck of claim 1, wherein the outrigger-wheel deployment means includes an outrigger-wheel mount foundation coupled to the load carrier and an outrigger-wheel mount coupled to the outrigger wheel unit and mounted to move on and relative to the outrigger-wheel mount foundation to cause the outrigger wheel unit to move in the inward direction toward the carrier wheel unit during movement of the outrigger wheel unit from the retracted storage position to the extended carrier-stabilizer position.

10. The multi-mode hand truck of claim 9, wherein the outrigger-wheel mount foundation includes a first foundation leg and the outrigger-wheel mount includes a first mount leg coupled to the first foundation leg to move relative to the first foundation leg during movement of the outrigger wheel unit relative to the carrier wheel unit.

11. The multi-mode hand truck of claim 10, wherein the first foundation leg is coupled to the load carrier for pivotable movement about a first carrier pivot axis during movement of the outrigger wheel unit between the retracted storage position and the extended carrier-stabilizer position and relative to the carrier wheel unit.

12. The multi-mode hand truck of claim 10, wherein the outrigger-wheel mount foundation further includes a second foundation leg arranged to lie in spaced-apart relation to the first foundation leg and a foundation crossbar arranged to interconnect the first and second foundation legs, the outrigger-wheel mount includes a second mount leg coupled to the second foundation leg to move relative to the second foundation leg during movement of the outrigger wheel unit relative to the carrier wheel unit and a mount-leg connector coupled to the first and second mount legs to move therewith relative to the first and second foundation legs, and the outrigger wheel unit is coupled to the mount-leg connector to move therewith.

13. The multi-mode hand truck of claim 9, wherein the outrigger-wheel mount foundation is coupled to the load carrier of the rolling base for pivotable movement about a first carrier pivot axis during movement of the outrigger wheel unit between the retracted storage position and the extended carrier-stabilizer position.

14. The multi-mode hand truck of claim 13, wherein the rolling load-carrier stabilizer further includes a pivotable carrier-recline support link coupled at one end thereof to the load carrier for pivotable movement about a second carrier pivot axis arranged to lie in spaced-apart parallel relation to the first carrier pivot axis and coupled at another end thereof to the outrigger-wheel mount for pivotable movement about a frame mount pivot axis arranged to lie in spaced-apart parallel relation to each of the first and second carrier pivot axes and wherein the pivotable carrier-recline support link is configured to pivot about the second carrier pivot axis and the frame mount pivot axis during movement of the outrigger wheel unit between the retracted storage position and the extended carrier-stabilizer position and to provide means for supporting the load carrier in a reclined position in response to movement of the outrigger wheel unit to the extended carrier-stabilizer position.

15. The multi-mode hand truck of claim 13, wherein the outrigger-wheel mount foundation includes spaced-apart first and second foundation legs and a foundation crossbar arranged to interconnect the first and second foundation legs and lie in spaced-apart relation to the first carrier pivot axis and each of the first and second foundation legs is pivotably coupled to the load carrier at the first carrier pivot axis.

16. The multi-mode hand truck of claim 15, wherein the outrigger-wheel mount includes a first mount leg coupled to a proximal portion of the first foundation leg to slide back and forth thereon during movement of the outrigger wheel unit between the retracted storage position and the extended carrier-stabilizer position, a second mount leg coupled to a proximal portion of the second foundation leg to slide back and forth thereon during movement of the outrigger wheel unit between the retracted storage position and the extended carrier-stabilizer position, and a mount-leg connector arranged to interconnect distal portions of the first and second mount legs and the outrigger wheel unit is coupled to the mount-leg connector to cause the outrigger wheel unit to move toward and away from the carrier wheel unit during movement of the outrigger wheel unit between the retracted storage position and the extended carrier-stabilizer position.

17. The multi-mode hand truck of claim 9, wherein the rolling load-carrier stabilizer includes an outrigger-wheel mount position retainer configured to provide means for selectively retaining the outrigger-wheel mount in a stationary expanded position relative to the outrigger-wheel mount foundation to cause the outrigger wheel unit to lie a first distance from the carrier wheel unit upon movement of the outrigger wheel unit to assume the retracted storage position to establish the two-wheel hand truck mode and for retaining the outrigger-wheel mount in a stationary contracted position relative to the outrigger-wheel mount foundation to cause the outrigger wheel unit to lie a lesser second distance from the carrier wheel unit upon movement of the outrigger wheel unit to assume the extended carrier-stabilizer position to establish the outrigger-wheel hand truck mode.

18. The multi-mode hand truck of claim 17, wherein the outrigger-wheel mount position retainer includes a foundation-anchor receiver coupled to the outrigger-wheel foundation mount and a frame lock unit coupled to the outrigger-wheel mount, the frame lock unit includes a foundation anchor and an anchor mover, the foundation anchor is configured to mate with the foundation-anchor receiver upon movement of the outrigger-wheel mount relative to the outrigger-wheel mount foundation to assume the stationary contracted position to block relative movement of the outrigger-wheel mount and the outrigger-wheel mount foundation and retain the outrigger wheel unit in the extended carrier-stabilizer position to maintain the outrigger-wheel hand truck mode, and the anchor mover is coupled to the outrigger-wheel mount and configured to provide means for moving the foundation anchor relative to the foundation-anchor receiver to separate from the foundation-anchor receiver to free the outrigger-wheel mount to move relative to the outrigger-wheel mount foundation.

19. The multi-mode hand truck of claim 18, wherein the outrigger-wheel mount foundation includes spaced-apart first and second foundation legs and the foundation-anchor receiver is a crossbar arranged to interconnect the spaced-apart first and second foundation legs.

20. The multi-mode hand truck of claim 18, wherein the outrigger-wheel mount includes spaced-apart first and second mount legs and a mount crossbar arranged to extend between the first and second mount legs and the anchor mover is coupled to the mount crossbar to move therewith relative to the outrigger-wheel mount foundation.

21. The multi-mode hand truck of claim 20, wherein the outrigger-wheel mount foundation includes spaced-apart first and second foundation legs and the foundation-anchor receiver is a crossbar arranged to interconnect the spaced-apart first and second foundation legs.

22. The multi-mode hand truck of claim 17, wherein the outrigger-wheel mount position retainer includes a carrier-anchor receiver coupled to the load carrier and a frame lock unit coupled to the outrigger-wheel mount, the frame lock unit includes a load-carrier anchor and an anchor mover, the load-carrier anchor is configured to mate with the carrier-anchor receiver upon movement of the outrigger-wheel mount relative to the outrigger-wheel mount foundation to assume the stationary expanded position and movement of the outrigger wheel unit to assume the retracted storage position to block relative movement of the outrigger wheel movement away from the retracted storage position, and the anchor mover is coupled to the outrigger-wheel mount and configured to provide means for moving the load-carrier anchor relative to the carrier-anchor receiver to separate from the carrier-anchor receiver to free the outrigger-wheel mount to move relative to the load carrier.

23. The multi-mode hand truck of claim 22, wherein the load carrier includes a truck frame and a toe-plate shelf coupled to the truck frame, the truck frame includes spaced-apart first and second upright rails, and the carrier-anchor receiver is a crossbar arranged to interconnect the spaced-apart first and second upright rails.

24. The multi-mode hand truck of claim 23, wherein the first upright rail is formed to include a lug-receiver channel opening toward the outrigger-wheel mount upon movement of the outrigger wheel unit to assume the retracted storage position and the outrigger-wheel mount includes a lug arranged to extend into the lug-receiver channel upon movement of the outrigger wheel unit to assume the retracted storage position to limit lateral movement of the outrigger wheel unit relative to the truck frame.

25. A multi-mode hand truck comprising
a rolling base including a load carrier and a carrier wheel unit coupled to the load carrier, the load carrier having a toe plate shelf and a truck frame extending up from the toe plate shelf, and
a rolling load-carrier stabilizer including an outrigger wheel unit and an outrigger-wheel mover coupled to the load carrier and to the outrigger wheel unit, wherein the outrigger-wheel mover includes an extensible wheel-support frame coupled to the load carrier for pivotable movement about a first carrier pivot axis and a pivotable carrier-recline support link coupled to the load carrier for pivotable movement about a second carrier pivot axis and to the extensible wheel-support frame for pivotable movement about a frame mount pivot axis and wherein the outrigger wheel unit is coupled to the extensible wheel-support frame and the extensible wheel-support frame is arranged to move between a retracted storage position located along and substantially parallel to the truck frame and an extended carrier-stabilizer position away from the load carrier during pivoting movement of the extensible wheel-support frame about the first carrier pivot axis and pivoting movement of the pivotable carrier-recline support link about the second carrier pivot axis and the frame mount pivot axis, further comprising a base pusher coupled to the load carrier, and wherein the base pusher includes a push handle coupled to the load carrier for slidable movement relative to the load carrier and a pivotable push-handle support link coupled to the load carrier for pivotable movement about a third carrier pivot axis and to the push handle for pivotable movement about a handle mount pivot axis, and wherein the push handle is arranged to move relative to the load carrier while slidably coupled to the load carrier between a retracted truck-pusher position arranged to lie alongside the load carrier and an extended cart-pusher position extending upwardly away from the load carrier during pivoting movement of the pivotable push-handle support link about the third carrier pivot axis and the handle mount pivot axis.

26. A multi-mode hand truck comprising
a rolling base including a load carrier and a carrier wheel unit coupled to the load carrier,
a rolling load-carrier stabilizer including a foldable stabilizer frame coupled to the load carrier for movement relative to the load carrier between a folded position and an unfolded position, an outrigger wheel unit coupled to the foldable stabilizer frame for movement therewith between a retracted storage position alongside the load carrier and an extended carrier-stabilizer position away from the load carrier, and a frame lock unit coupled to the foldable stabilizer frame and configured to mate with the load carrier to retain the outrigger wheel unit in the retracted storage position and further configured to unmate and be spaced-apart from the load carrier in the extended carrier-stabilizer position, and
wherein the foldable stabilizer frame includes an extensible wheel-support frame including an outrigger-wheel mount coupled to the outrigger wheel unit and an outrigger-wheel mount foundation coupled to the load carrier, the outrigger-wheel mount is coupled to the outrigger-wheel mount foundation for relative movement to lengthen the extensible wheel-support frame upon movement of the outrigger wheel unit to the retracted storage position and to shorten the extensible wheel-support frame upon movement of the outrigger wheel unit to the extended carrier-stabilizer position, and the frame lock unit is coupled to the outrigger-wheel mount to move therewith and formed to include a load carrier anchor configured to mate with the load carrier to retain the outrigger wheel unit in the retracted storage position, a foundation anchor configured to mate with the outrigger-wheel mount foundation to retain the outrigger wheel unit in the extended carrier-stabilizer position, and an anchor mover coupled to the load-carrier anchor and to the foundation anchor to move those anchors relative to the foldable stabilizer frame to free the foldable stabilizer frame for movement relative to the load carrier.

27. The multi-mode hand truck of claim 26, wherein the foldable stabilizer frame further includes a pivotable carrier-recline support link pivotably coupled to the load carrier and to the outrigger-wheel mount to move relative to the extensible wheel-support frame during folding and unfolding of the foldable stabilizer frame.

28. A multi-mode hand truck comprising
a push cart including a rolling base including a load carrier and a carrier wheel unit coupled to the load carrier, a wheel support coupled to the load carrier, and an outrigger wheel unit mounted on the wheel support and arranged to lie in spaced-apart relation to the carrier wheel unit, and
a pusher coupled to the load carrier, wherein the pusher includes a push handle coupled to the load carrier for slidable movement relative to the load carrier and a pivotable push-handle support link directly coupled to the load carrier for pivotable movement about a carrier pivot axis and to the push handle for pivotable movement about a handle mount pivot axis and wherein the push handle is arranged to move relative to the load carrier while slidably coupled to the load carrier between a retracted truck-pusher position arranged to lie alongside the load carrier and an extended cart-pusher position extending upwardly away from the load carrier during pivoting movement of the pivotable push-handle support link about the carrier pivot axis and the handle mount pivot axis.

29. A multi-mode hand truck comprising
a rolling base including a load carrier and a carrier wheel unit coupled to the load carrier
a rolling load-carrier stabilizer including an outrigger wheel unit and outrigger-wheel deployment means for moving the outrigger wheel unit from a retracted storage position located in close proximity to the load carrier and away from ground underlying and engaging the carrier wheel unit and arranged to cause the rolling load-carrier stabilizer to cooperate with the rolling base to establish a two-wheel hand truck mode to an extended carrier-stabilizer position located in spaced-apart relation to the load carrier and in contact with ground underlying and engaging the carrier wheel unit and arranged to cause the rolling load-carrier stabilizer to cooperate with the rolling base to establish an outrigger-wheel hand truck mode in response to movement of the outrigger wheel unit in an inward direction toward the carrier wheel unit
wherein the outrigger-wheel deployment means includes an extensible wheel-support frame coupled to the outrigger wheel unit and the extensible wheel-support frame is also coupled to the load carrier for pivotable movement about a first carrier pivot axis and is configured to vary in length to vary distance between the outrigger wheel unit and the carrier wheel unit during movement of the outrigger wheel unit between the retracted storage position and the extended carrier-stabilizer position and the carrier wheel unit
wherein the rolling load-carrier stabilizer further includes frame position-retainer means for selectively keeping the extensible wheel-support frame in one of a lengthened position arranged to lie alongside the load carrier upon movement of the outrigger wheel unit to assume the retracted storage position to retain the outrigger wheel unit in the retracted storage position to establish and maintain the two-wheel hand truck mode and a shortened position arranged to lie at an angle to the load carrier upon movement of the outrigger wheel unit to assume the extended carrier-stabilizer position to retain the outrigger wheel unit in the extended carrier-stabilizer position and establish and maintain the outrigger-wheel hand truck mode and wherein the frame position-retainer means includes a carrier-anchor receiver coupled to the load carrier and a frame lock unit coupled to the extensible wheel-support frame and the frame lock unit includes a load-carrier anchor and an anchor mover, the load-carrier anchor is configured to mate with the carrier-anchor receiver upon movement of the extensible wheel-support frame to the lengthened position arranged to lie alongside the load carrier to block movement of the outrigger wheel unit away from the retracted storage position, and the anchor mover is coupled to the extensible wheel-support frame and configured to provide means for moving the load-carrier anchor relative to the carrier-anchor receiver to separate from the carrier-anchor receiver to free the extensible wheel-support frame to move from the lengthened position toward the shortened position.

30. A multi-mode hand truck comprising a rolling base including a load carrier and a carrier wheel unit coupled to the load carrier a rolling load-carrier stabilizer including an outrigger wheel unit and outrigger-wheel deployment means for moving the outrigger wheel unit from a retracted storage position located in close proximity to the load carrier and away from ground underlying and engaging the carrier wheel unit and arranged to cause the rolling load-carrier stabilizer to cooperate with the rolling base to establish a two-wheel hand truck mode to an extended carrier-stabilizer position located in spaced-apart relation to the load carrier and in contact with ground underlying and engaging the carrier wheel unit and arranged to cause the rolling load-carrier stabilizer to cooperate with the rolling base to establish an outrigger-wheel hand truck mode in response to movement of the outrigger wheel unit in an inward direction toward the carrier wheel unit wherein the outrigger-wheel deployment means includes an outrigger-wheel mount foundation coupled to the load carrier and an outrigger-wheel mount coupled to the outrigger wheel unit and mounted to move on and relative to the outrigger-wheel mount foundation to cause the outrigger wheel unit to move in the inward direction toward the carrier wheel unit during movement of the outrigger wheel unit from the retracted storage position to the extended carrier-stabilizer position and wherein the outrigger-wheel mount foundation is coupled to the load carrier of the rolling base for pivotable movement about a first carrier pivot axis during movement of the outrigger wheel unit between the retracted storage position and the extended carrier-stabilizer position.

31. A multi-mode hand truck comprising a rolling base including a load carrier and a carrier wheel unit coupled to the load carrier a rolling load-carrier stabilizer including an outrigger wheel unit and outrigger-wheel deployment means for moving the outrigger wheel unit from a retracted storage position located in close proximity to the load carrier and away from ground underlying and engaging the carrier wheel unit and arranged to cause the rolling load-carrier stabilizer to cooperate with the rolling base to establish a two-wheel hand truck mode to an extended carrier-stabilizer position located in spaced-apart relation to the load carrier and in contact with ground underlying and engaging the carrier wheel unit and arranged to cause the rolling load-carrier stabilizer to cooperate with the rolling base to establish an outrigger-wheel hand truck mode in response to movement of the outrigger wheel unit in an inward direction toward the carrier wheel unit wherein the outrigger-wheel deployment means includes an outrigger-wheel mount foundation coupled to the load carrier and an outrigger-wheel mount coupled to the outrigger wheel unit and mounted to move on and relative to the outrigger-wheel mount foundation to cause the outrigger wheel unit to move in the inward direction toward the carrier wheel unit during movement of the outrigger wheel unit from the retracted storage position to the extended carrier-stabilizer position wherein the rolling load-carrier stabilizer includes an outrigger-wheel mount position retainer configured to provide means for selectively retaining the outrigger-wheel mount in a stationary expanded position relative to the outrigger-wheel mount foundation to cause the outrigger wheel unit to lie a first distance from the carrier wheel unit upon movement of the outrigger wheel unit to assume the retracted storage position to establish the two-wheel hand truck mode and for retaining the outrigger-wheel mount in a stationary contracted position relative to the outrigger-wheel mount foundation to cause the outrigger wheel unit to lie a lesser second distance from the carrier wheel unit upon movement of the outrigger wheel unit to assume the extended carrier-stabilizer position to establish the outrigger-wheel hand truck mode and wherein the outrigger-wheel mount position retainer includes a foundation-anchor receiver coupled to the outrigger-wheel foundation mount and a frame lock unit coupled to the outrigger-wheel mount, the frame lock unit includes a foundation anchor and an anchor mover, the foundation anchor is configured to mate with the foundation-anchor receiver upon movement of the outrigger-wheel mount relative to the outrigger-wheel mount foundation to assume the stationary contracted position to block relative movement of the outrigger-wheel mount and the outrigger-wheel mount foundation and retain the outrigger wheel unit in the extended carrier-stabilizer position to maintain the outrigger-wheel hand truck mode, and the anchor mover is coupled to the outrigger-wheel mount and configured to provide means for moving the foundation anchor relative to the foundation-anchor receiver to separate from the foundation-anchor receiver to free the outrigger-wheel mount to move relative to the outrigger-wheel mount foundation.

32. A multi-mode hand truck comprising a rolling base including a load carrier and a carrier wheel unit coupled to the load carrier a rolling load-carrier stabilizer including an outrigger wheel unit and an outrigger-wheel mover coupled to the load carrier and to the outrigger wheel unit, wherein the outrigger-wheel mover includes an extensible wheel-support frame coupled to the load carrier for pivotable movement about a first carrier pivot axis and a pivotable carrier-recline support link coupled to the load carrier for pivotable movement about a second carrier pivot axis and to the extensible wheel-support frame for pivotable movement about a frame mount pivot axis and wherein the outrigger wheel unit is coupled to the extensible wheel-support frame and arranged to move between a retracted storage position near the load carrier and an extended carrier-stabilizer position away from the load carrier during pivoting movement of the extensible wheel-support frame about the first carrier pivot axis and pivoting movement of the pivotable carrier-recline support link about the second carrier pivot axis and the frame mount pivot axis and further comprising a base pusher coupled to the load carrier, and wherein the base pusher includes a push handle coupled to the load carrier for slidable movement relative to the load carrier and a pivotable push-handle support link coupled to the load carrier for pivotable movement about a third carrier pivot axis and to the push handle for pivotable movement about a handle mount pivot axis and wherein the push handle is arranged to move relative to the load carrier while slidably coupled to the load carrier between a retracted truck-pusher position arranged to lie alongside the load carrier and an extended cart-pusher position extending upwardly away from the load carrier during pivoting movement of the pivotable push-handle support link about the third carrier pivot axis and the handle mount pivot axis.

33. A multi-mode hand truck comprising a rolling base including a load carrier and a carrier wheel unit coupled to the load carrier a rolling load-carrier stabilizer including a foldable stabilizer frame coupled to the load carrier for movement relative to the load carrier between a folded position and an unfolded position, an outrigger wheel unit coupled to the foldable stabilizer frame for movement therewith between a retracted storage position alongside the load carrier and an extended carrier-stabilizer position away from the load carrier, and a frame lock unit coupled to the foldable stabilizer frame and configured to lock the foldable stabilizer frame to the load carrier to retain the outrigger wheel unit in the retracted storage position and wherein the foldable stabilizer frame includes an extensible wheel-support frame including an outrigger-wheel mount coupled to the outrigger wheel unit and an outrigger-wheel mount foundation coupled to the load carrier, the outrigger-wheel mount is coupled to the outrigger-wheel mount foundation for relative movement to lengthen the extensible wheel-support frame upon movement of the outrigger wheel unit to the retracted storage position and to shorten the extensible wheel-support frame upon movement of the outrigger wheel unit to the extended carrier-stabilizer position, and the frame lock unit is coupled to the outrigger-wheel mount to move therewith and formed to include a load carrier anchor configured to mate with the load carrier to retain the outrigger wheel unit in the retracted storage position, a foundation anchor configured to mate with the outrigger-wheel mount foundation to retain the outrigger wheel unit in the extended carrier-stabilizer position, and an anchor mover coupled to the load-carrier anchor and to the foundation anchor to move those anchors relative to the foldable stabilizer frame to free the foldable stabilizer frame for movement relative to the load carrier.

\* \* \* \* \*